(12) United States Patent
Freeman et al.

(10) Patent No.: US 7,200,972 B1
(45) Date of Patent: Apr. 10, 2007

(54) BUILDING TRUSS HAVING A CONNECTOR WITH AN INTEGRAL MOUNTING TO SUPPORTING STRUCTURE

(75) Inventors: Kevin Wesley Freeman, Rockford, MI (US); John Sirowatka, Alto, MI (US)

(73) Assignee: Universal Forest Products, Grand Rapids, MI (US)

( * ) Notice: Subject to any disclaimer, the term of this patent is extended or adjusted under 35 U.S.C. 154(b) by 462 days.

(21) Appl. No.: 10/605,595

(22) Filed: Oct. 10, 2003

Related U.S. Application Data

(60) Provisional application No. 60/319,658, filed on Oct. 29, 2002.

(51) Int. Cl.
*E04B 1/32* (2006.01)
(52) U.S. Cl. .......................................... 52/641; 52/712
(58) Field of Classification Search ................. 52/712, 52/714, 715, 66, 71, 90.1, 645, 641, 695, 52/704, 633, 634, 636, 180, 181, 408.1, 638; 411/466
See application file for complete search history.

(56) References Cited

U.S. PATENT DOCUMENTS

| | | | | | |
|---|---|---|---|---|---|
| 1,237,137 | A | * | 8/1917 | Wuellner | 52/638 |
| 3,727,354 | A | * | 4/1973 | Powell | 52/71 |
| 5,094,059 | A | * | 3/1992 | Ganescu | 52/641 |
| 5,109,646 | A | * | 5/1992 | Colonias et al. | 52/712 |
| 5,561,949 | A | * | 10/1996 | Knoth | 52/92.2 |
| 5,640,822 | A | * | 6/1997 | Haswell | 52/712 |
| 5,819,492 | A | * | 10/1998 | Konicek | 52/641 |
| 6,171,043 | B1 | * | 1/2001 | Williams | 411/466 |
| 6,295,781 | B1 | * | 10/2001 | Thompson | 52/712 |

* cited by examiner

*Primary Examiner*—Naoko Slack
*Assistant Examiner*—William Gilbert
(74) *Attorney, Agent, or Firm*—McGarry Bair PC

(57) ABSTRACT

A truss and connector assembly for use in housing structures is shown. The connector provides a direct and integral mounting of the truss to the wall studs to provide increased mounting strength for the roof assembly to the side walls of a structure. A connector according to the invention can be integrally preassembled to a truss at one location and connected to remaining portions of the truss at a separate location.

15 Claims, 42 Drawing Sheets

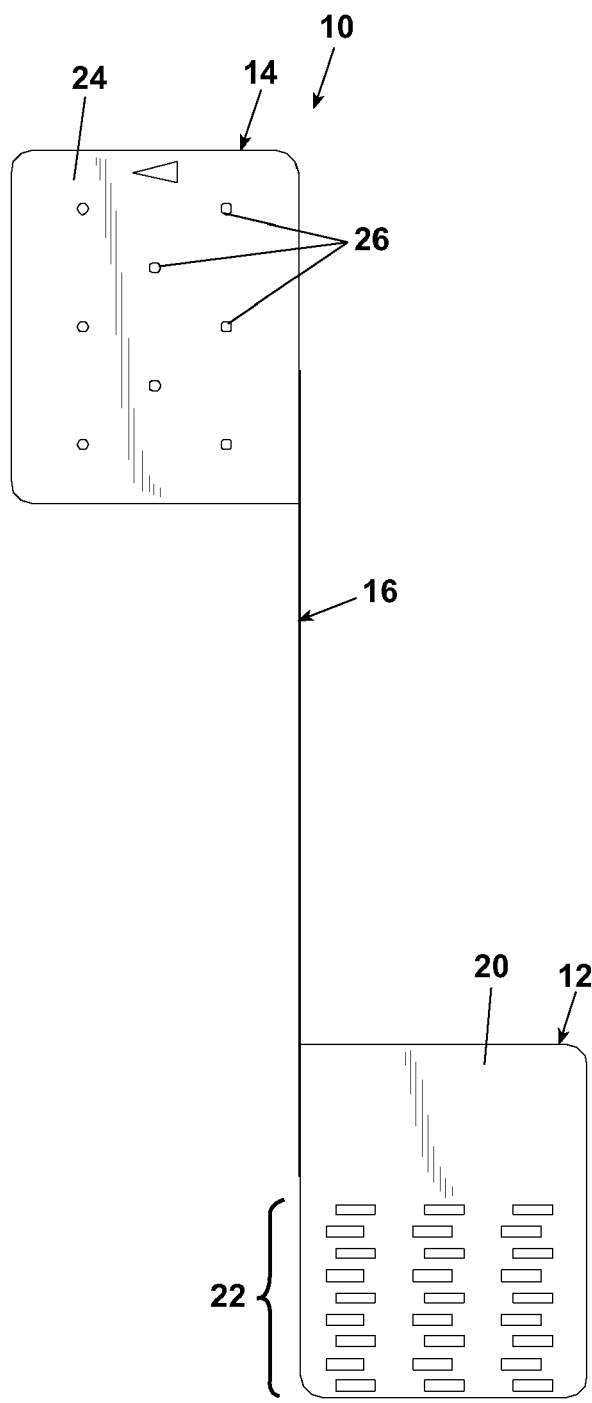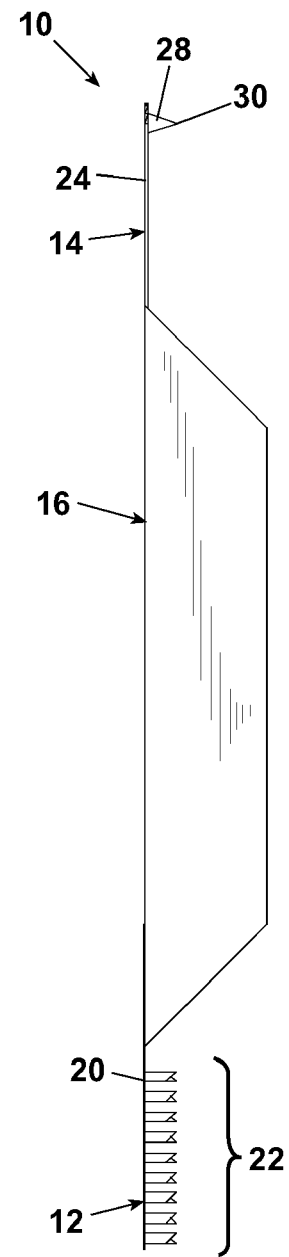
Fig. 22                          Fig. 23

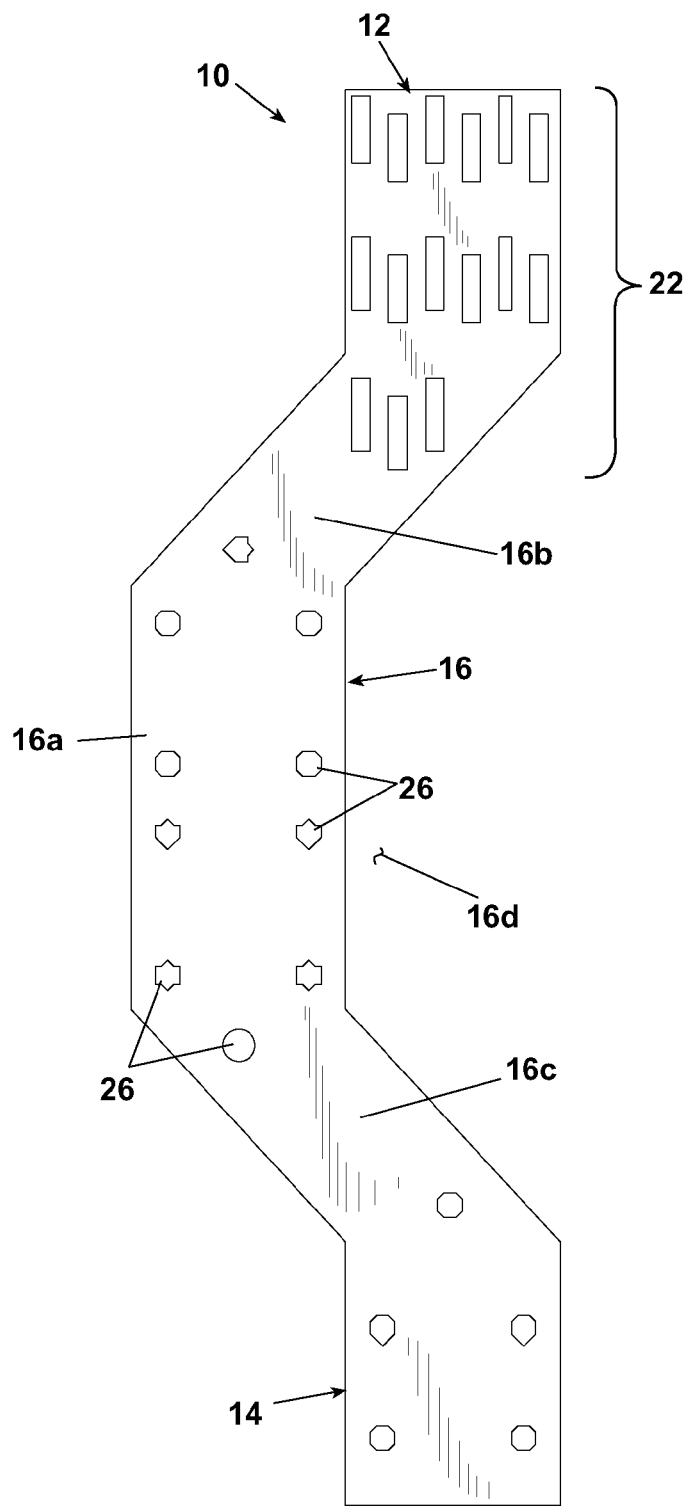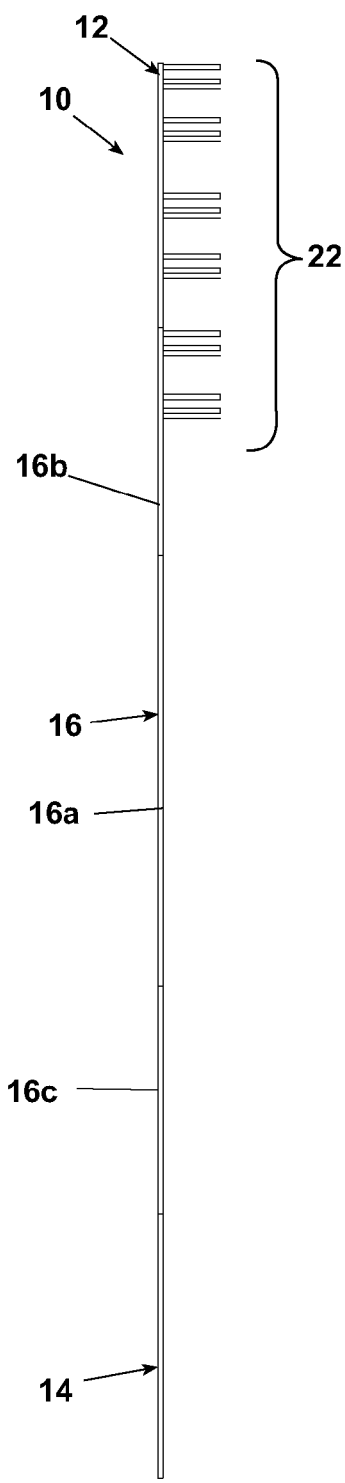
Fig. 32  Fig. 33

BUILDING TRUSS HAVING A CONNECTOR WITH AN INTEGRAL MOUNTING TO SUPPORTING STRUCTURE

CROSS REFERENCE TO RELATED APPLICATIONS

This application claims the benefit of U.S. Provisional Application Ser. No. 60/319,658, filed on Oct. 29, 2002.

BACKGROUND OF INVENTION

1. Field of the Invention

This invention relates to a connector for a truss assembly for the framework of a building and, more particularly, to a preassembled truss having a connector for securing internal chords of a truss to one another. In one particular aspect, the invention is particularly beneficial for preassembled roof trusses which are manufactured at a facility and shipped to a home builder's facility for installation on a roof truss and/or to a worksite for installation, such as in a modular housing structure.

2. Description of the Related Art

The structural framework of a conventional structure typically comprises a plurality of wall studs spaced from one another, a horizontal top plate extending along the top edge of each of the wall studs and a plurality of roof trusses mounted to the top plate or studs. Internal chords making up a roof trusses must be securely mounted to one another to ensure a solid, rigid structure when the truss is finally mounted on a supporting structure.

Prior art connector straps have some shortcomings when applied in the area of preassembled (often referred to as "manufactured" or "modular") homes. Modular home builders have difficulty designing a satisfactory uplift connection between a knee wall and a kingpost or a bottom chord of a roof truss for a modular home. The roof is typically raised into a final position at the construction site and the installers must then make the final connection between the knee wall and the kingpost/bottom chord. The current industry "standard" for making these connections is for builders to "shoot" nails from pneumatic nail guns at an angle (often referred to as a "toe nail") to the knee wall into at least a runner rail and a kingpost. They also may use a wood sidemember placed along side the folding knee wall and kingpost secured with pneumatically driven nails or staples.

Currently, the manufacturers use a variety of methods to achieve this connection, including toe-nailing the knee wall to the kingpost or applying a side member attached with nails to both the knee wall and kingpost. These methods have very little quality control and result in field connections with widely varying levels of quality and structural strength. Building inspectors often become concerned about the lack of consistency in the design and application of these field connections on modular trusses. Building inspectors in several states (e.g., Michigan and New York) have expressed serious reservations about allowing manufacturers to continue making the connection with only toe nails or wood side-members. Many building inspectors have deemed these connection methods unsatisfactory.

SUMMARY OF INVENTION

In various aspects, the invention relates to a truss and a connector for use in conventional building and/or housing structures. The strap provides a direct and integral mounting to internal chords making up the truss to provide increased mounting strength for the truss. A connector according to the invention can be integrally preassembled to a truss at one location and rigidly erected into a final position atop a supporting structure at an installation location.

A strong, "clean" pre-engineered connection can be built integral with the truss at the time of truss manufacture. This saves home building setup crews from making job-specific connections between roof truss components which may include cutting numerous wood blocks and driving numerous mechanical fasteners (nails and staples) to attempt to provide a finished field connection. Rather, the connector described herein is a pre-engineered connection that can readily be evaluated by structural engineers and building inspectors for performance. The integral connection saves setup crews time when making final connections. Due to the pre-engineered nature of the connector, building inspectors more readily accept the fastening method, thereby resulting in fewer call-backs and design rejections by building inspectors.

Because the connector is installed integral to the truss at the time of truss manufacture, the connector can be shipped with a preassembled truss and allows a home setup crew to quickly and efficiently fasten sub-components of a roof truss (such as a swing-down knee-wall connection to a king post, and also to attach a swing-down knee wall in a Cape Cod-style design. By providing this integral connection, manufacturers are able to set up their houses more expeditiously with a much higher-quality connection between the knee wall and king post and/or the knee wall and the bottom chord of a roof truss.

In one aspect, the invention relates to a connector strap for a truss made up of a matrix of interconnected chords comprising: a web having a first end and a second end; a first sidestep portion extending laterally from the first end of the web; a second sidestep portion extending laterally from the second end of the web; wherein the first sidestep portion and the second sidestep portion cooperate to form a recess whereby the connector strap can be used to interconnect a first and a second chord member of the truss while being passed around a third chord member of the truss that is disposed in the recess.

In another aspect, the invention relates to a prefabricated roof truss that is positionable in a first collapsed position and a second erected position comprising: a matrix of interconnected chord members forming a truss in the second erected position; a first chord member of the truss having a connector strap mounted thereto, the connector strap having a first end interconnected to the first chord member and a second end extending therefrom, the first and second ends having an offset portion therebetween that defines a recess therebetween; a second chord member that is positionable adjacent to the first chord member, wherein the second end of the connector is adapted to be interconnected to the second chord member when the truss is positioned in the second, erected position; a third chord member positionable adjacent to and generally orthogonally to the first and second chord members and generally intersecting the first and second chord members, wherein the third chord member is at least partially received in the recess of the connector when the first and second ends thereof are mounted to the respective first and second chords.

Various embodiments of the invention are also contemplated. For example, the web can be elongated or planar. The web can include a hinge portion between the first end and the second end thereof, wherein the first sidestep portion can thereby be pivoted with respect to the second sidestep portion. The web can include at least one mounting portion thereon.

The mounting portion can comprise an aperture. The mounting portion can comprise an integral connector. The mounting portion can comprise a drivable connector. The mounting portion can comprise a nail plate.

The first sidestep portion can include at least one mounting portion thereon. The second sidestep portion can include at least one mounting portion thereon. The web can be deformable between a first linear position and a second final mounting position, whereby the web can be de-formed when mounted between a pair of chord members in the truss. The first sidestep portion can have an integral mounting portion thereon and the second sidestep portion can have a field mounting thereon. The integral mounting portion of the first sidestep portion can be integrally mounted to a first chord member of the truss at the time of manufacture of the truss, and the second sidestep portion can be extended from the first truss member in a position adapted to receive a second chord member of the truss. The second truss member can be mounted to the second sidestep portion of the connector when the truss is erected in the field.

A third truss member can be positioned within the recess of the connector to allow the connector to wrap around the third chord member when mounting the first and second chord members together with the connector. The first and second sidestep portions can extend from the respective first and second ends of the connector in substantially the same lateral direction. The first and second sidestep portions can extend angularly from the respective first and second ends of the connector in substantially the same direction. The first and second sidestep portions can extend from the respective first and second ends of the connector in substantially the opposite lateral direction. The first and second sidestep portions can extend angularly from the respective first and second ends of the connector in substantially the opposite direction. At least one of the first and second sidestep portions can extend generally parallel to the web, and can be interconnected to the web in an offset manner by a laterally-extending connecting web. The laterally-extending connecting web can be oriented angularly with respect to the web.

The web can include a hinge portion between the first end and the second end thereof, wherein the first sidestep portion can thereby be pivoted with respect to the second sidestep portion. The web can be deformable between a first linear position and a second final mounting position, whereby the web can be deformed when mounted between a pair of chord members in the truss. The first sidestep portion can have an integral mounting portion thereon and the second sidestep portion can have a field mounting thereon.

BRIEF DESCRIPTION OF DRAWINGS

In the drawings:

FIG. 22 is a front elevational view of the second embodiment of the tie-down strap of FIG. 20.

FIG. 23 is a side elevational view of the second embodiment of the tie-down strap of FIG. 20.

FIG. 32 is a front elevational view of the third embodiment of the tie-down strap of FIG. 30.

FIG. 33 is a side elevational view of the third embodiment of the tie-down strap of FIG. 30.

DETAILED DESCRIPTION

Figure 1:
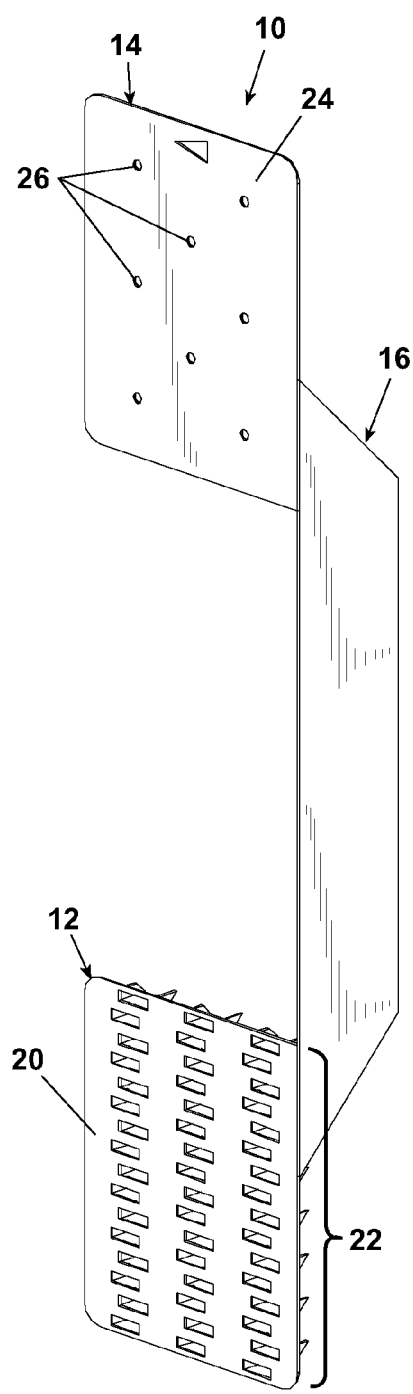
FIG. 1 is a perspective view of a first embodiment of a tie-down strap according to the invention, wherein a front elevational side of the tie-down strap is shown in detail.
Figure 2:
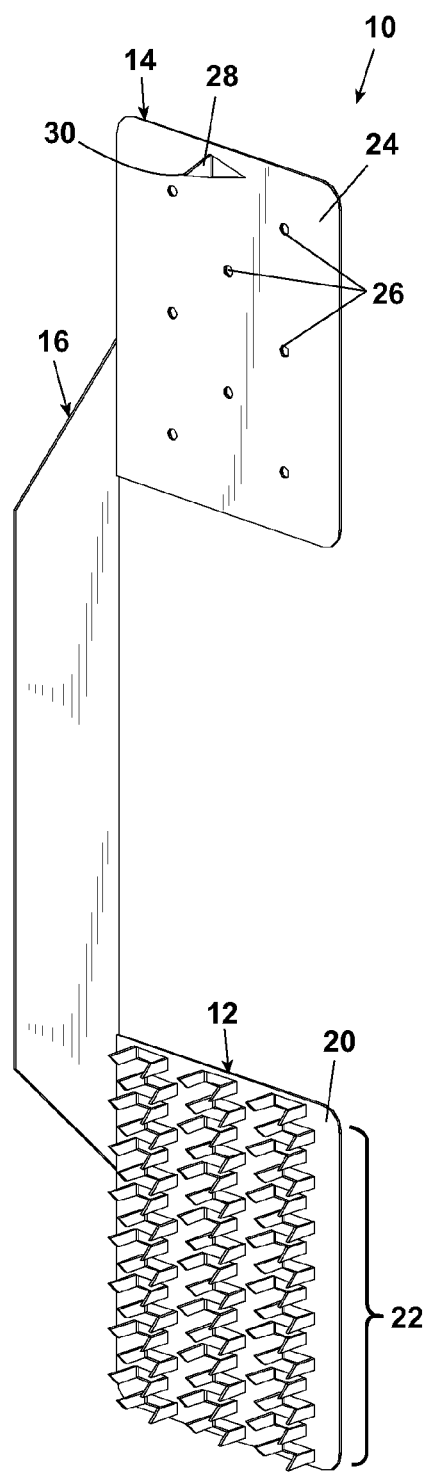
FIG. 2 is a perspective view of the first embodiment of the tie-down strap of FIG. 1, wherein a rear elevational side of the tie-down strap is shown in detail.
Figure 3:
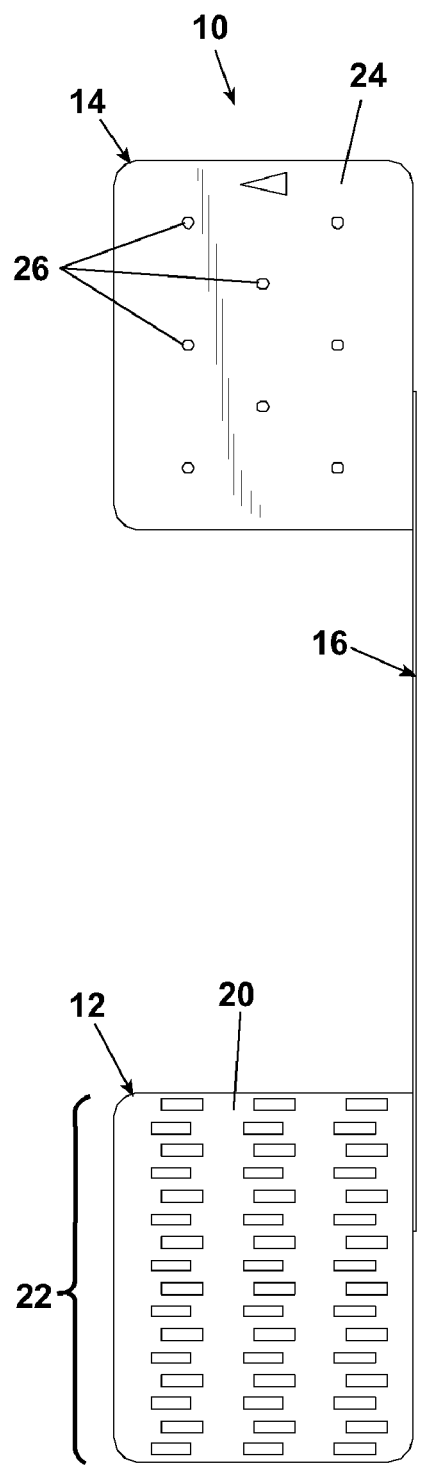
FIG. 3 is a front elevational view of the first embodiment of the tie-down strap of FIG. 1.
Figure 4:
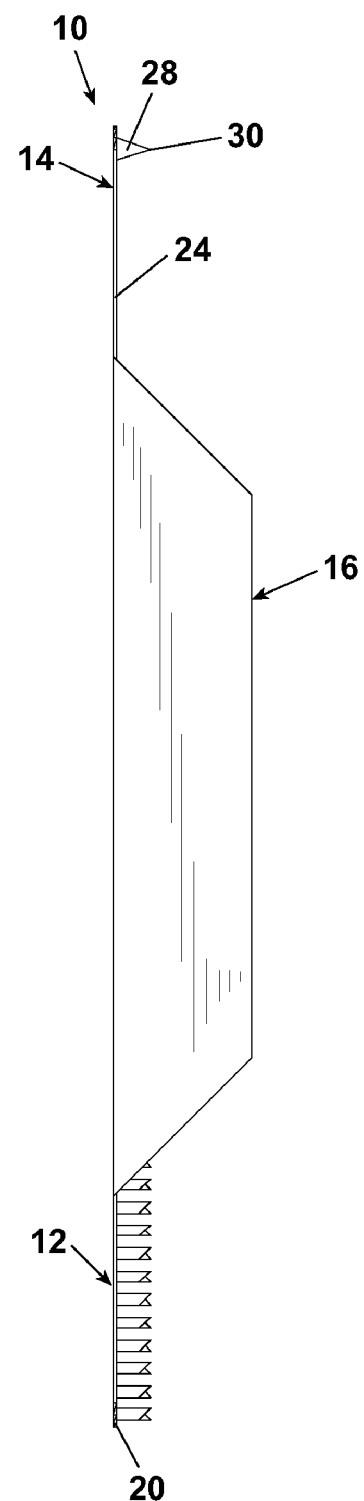
FIG. 4 is a side elevational view of the first embodiment of the tie-down strap of FIG. 1.

Referring now to the drawings and to FIGS. 1–4 in particular, a connector 10, commonly referred to as a "tie-down strap," is shown for the function of interconnecting various chords of a roof truss. While it has been found that making the connector 10 out of a 20-gauge galvanized steel is preferable, any suitable material having sufficient strength and flexibility for performing the required interconnection can be employed without departing from the scope of this invention.

The connector 10 comprises a first engagement portion 12 and a second engagement portion 14 interconnected by a web 16. Although the web 16 is shown as an elongated member extending at a generally orthogonal position with respect to the first and second engagement portions 12 and 14, any suitable member which interconnects the first and second engagement portions 12 and 14, holds the first and second engagement portions at a particular distance with respect to one another and can be bent at a selected angle is suitable for the web 16 and can be substituted for the web 16 shown in the drawings without departing from the scope of this invention. The web 16 can include additional optional features such as a ribs, slots, separated openings and the like to facilitate the bendable nature of the connector 10. Of course, it can be seen that bending the web 16 is an optional embodiment, and the web 16 can be simply provided as a rigid member as well.

The first engagement portion 12 is shown by example in FIGS. 1–4 and generally comprises a member suitable for integral interconnection to a wood member, such as a roof truss chord, such as those typical manufacturing steps performed during the preconstruction of a manufactured housing roof truss. In the example embodiment shown in FIGS. 1–4, the first engagement portion 12 generally comprises a plate 20 having several rearwardly-extending fasteners 22 adapted to the press-fit into a wood member, such as a roof truss chord, during a manufactured truss forming operation. In the example embodiment shown in FIGS. 1–4, the fasteners 22 comprise a nail plate configuration, typically formed by a stamping operation which rearwardly deforms several pointed tangs which can be integrally formed with a wood member during a stamping operation.

The second engagement portion 14 is shown by example in FIGS. 1–4 and generally comprises a member suitable for subsequent interconnection to a wood member, such as a roof truss chord. In the example embodiment shown in FIGS. 1–4, the second engagement portion 14 generally comprises a plate 24 having several apertures 26 suitable for receipt of a conventional fastener to attach the plate 24 to a wood member, such as a roof truss chord, during non-site assembly of manufactured housing. Typical fasteners used in these assembly operations include nails, screws, and the like.

The plate 24 can also include a pre-punched temporary fastening tab 28 which is preferably stamped from the plate 14 in a rearwardly direction and includes a pointed tip 30. The tab 28 is designed to be temporarily interconnected with a wood member during manufacturing and/or on-site manufactured housing assembly operations. Such temporary interconnection is typically performed by placing the plate 24 with the fastening tab 28 pointed toward the wood member to which the plate 24 is to be temporarily interconnected and hammering (or otherwise pressing) the plate 24 to drive the temporary fastening tab 28 into the wood member. The purpose of fastening the plate 24 into the wood member is to secure it during transportation of the completed, collapsed roof truss to a home builder's plant or installation site.

In assembly, the connector 10 can be formed in a number of ways without departing from the scope of this invention. For example, the first and second engagement portions 12 and 14 and the web 16 can be stamped or other-wise formed from a single piece of material and roll-formed, stamped or otherwise manipulated into the shapes shown in FIGS. 1–4. In addition, as another example, the first and second engagement portions 12 and 14 and the web 16 can be formed as separate members and interconnected in a conventional manner, such as by welding to form the shape shown in FIGS. 1–4. Other manufacturing techniques and processes can be employed to form the connector 10 without departing from the scope of this invention.

In use, the connector 10 is preferably integrally formed to a wood member. This integral formation of the connector 10 with a wood member is performed by hammering, pressing or otherwise inserting the fasteners 22 on the first engagement portion 12 into a wood member. Preferably, this manufacturing operation is performed at a manufacturing facility for forming manufactured housing components, although this step can be formed anywhere without departing from the scope of this invention.

FIGS. 5–19 show examples of the connector 10 in use. More particularly, these figures show examples of the use of the connector 10 in the manufacture and assembly of a roof truss. The commercial advantages of the connector 10 as described herein become particularly evident when use of the connector 10 is illustrated in connection with a collapsible roof truss which is erectable into an erected state from a collapsed state through the use of hinge joint interconnecting various chords of the roof truss. It will be understood that the particular configurations of roof trusses shown herein should not be construed as limiting on the scope of the invention, but rather indicative of the broad range of use of the connector 10.

The examples of the trusses shown herein are shown generally by reference 100 and include several common sub-components of trusses known in the art, such as: one or more top chords 102, a bottom chord 104, a vertical web chord 106, a diagonal web chord 108 a kingpost 110 (substituted with a collar tie 110 in some truss configurations), a knee wall 112, a ridge beam 114, a runner rail 116, and a peak chord 118. In addition, the roof trusses 100 shown herein also employ various connection components including, but not limited to: a conventional nail plate 120, a double-ganged hinged nail plate 122, and the like. It will be understood that, although different configurations of roof trusses 100 are shown herein, common sub-components of different configurations of the roof trusses 100 are identified with common reference numerals.

Also, some of the embodiments of the trusses 100 shown herein are shown atop a conventional stud wall 130. As shown by example, the conventional stud wall 130 shown in the drawings generally comprises a flooring member such as a floor joist 132 supporting vertically-extending walls 134.

FIGS. 5–7 and 8–10 show one embodiment of a roof truss 100 which generally forms one-half (i.e., a right triangular portion) of a roof for a housing structure into the movable between a collapsed and an erected structure, respectively.

Figure 5:
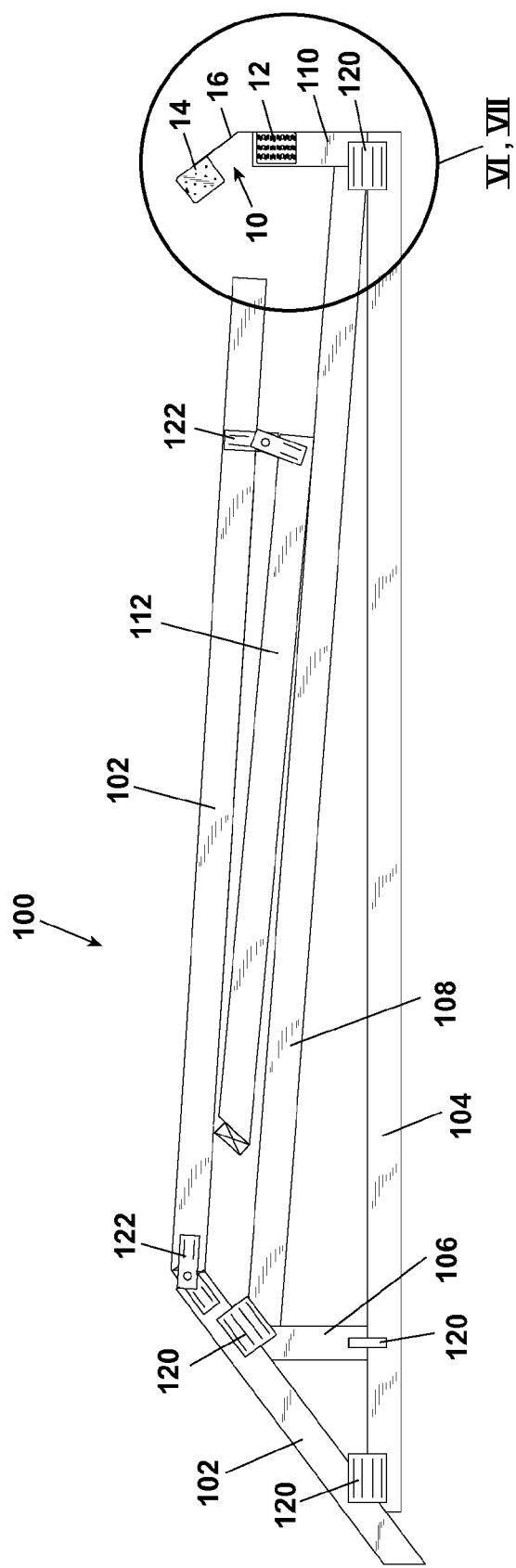
FIG. 5 is a front elevational view of a single monohinge truss having the tie-down strap of FIGS. 1–4 mounted thereto, wherein the truss is shown in a collapsed state.
Figure 6:
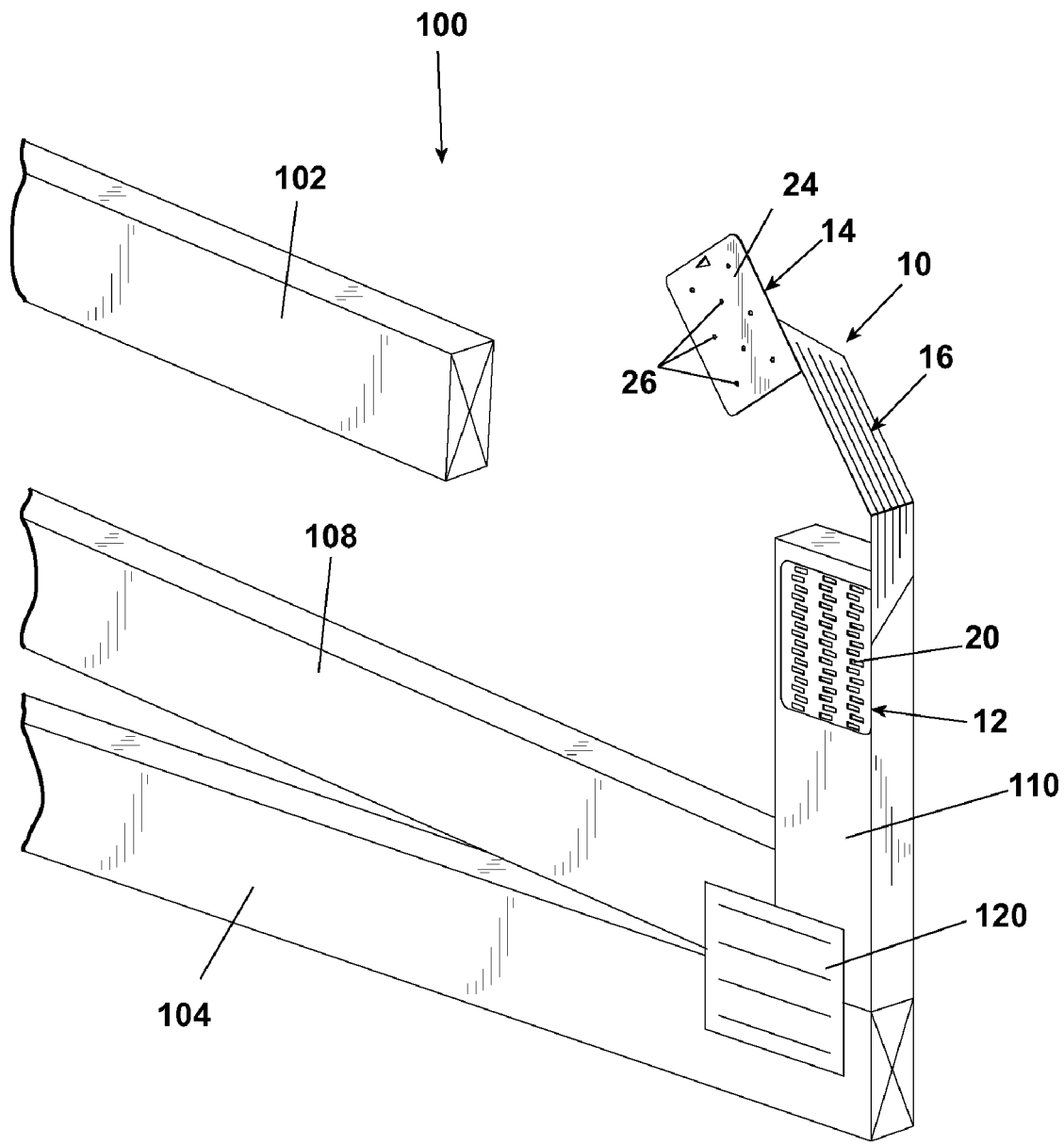
FIG. 6 is an enlarged perspective view of the area marked VI in FIG. 5.
Figure 7:
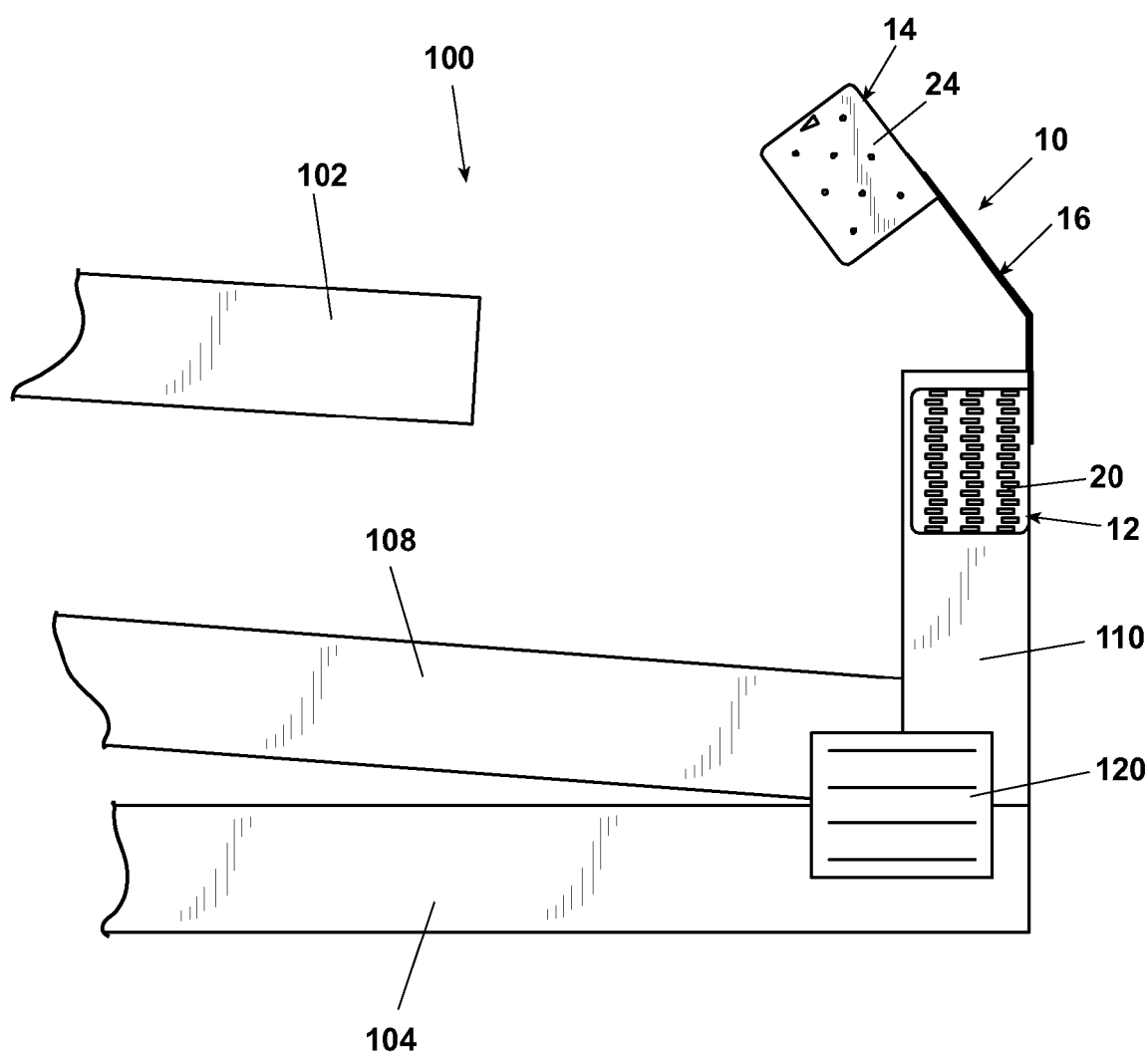
FIG. 7 is an enlarged front elevational view of the area marked VII in FIG. 5.

FIGS. 5–7 show a roof truss 100 in a mono truss formation which is in a collapsed state. The roof truss 100 shown in FIGS. 5–7 comprises an upper top chord and a lower top chord 102 interconnected at opposed ends by a first hinge plate 122. An outer end of the lower top chord 102 is interconnected by a fixed nail plate to an end of a bottom chord 104. An opposite end of the bottom chord 104 is fixed to a vertically-extending kingpost 110 and an end of a diagonal chord 108 by another nail plate 120. An opposite end of the diagonal chord 108 is interconnected to a vertical web chord 106 and to an upper end of the lower top chord 102 by another nail plate 120. A bottom end of the vertical web chord 106 is interconnected to the bottom chord 104 by a nail plate 120. At its upper end, the upper top chord 102 is interconnected to a knee wall 112 by a second hinge nail plate 122. A ridge beam 114 is typically mounted adjacent the kingpost 110 on the roof truss 100.

The connector 10 is interconnected to the upper end of the kingpost 110 by pressing the fasteners 22 on the plate 20 of the first engagement portion 12 into an upper surface of the kingpost 110. As also can be seen from FIGS. 5–7, the web 16 of the connector 10 is then at a predetermined angle, preferably in a manufacturing operation when the roof truss 100 was formed into its collapsed state. It is in this state, as shown in FIG. 5, that the roof truss 100 would be shipped from a truss manufacturing facility to a home-building facility or an on-site installation location for mounting atop a stud wall 130. If the roof truss 100 is shipped to a home builder's plant, the roof truss can be finished into a modular housing unit and shipped in a collapsed state to a final home-building site where the home is set on a foundation and the folded roof truss 100 is raised into place.

Figure 8:
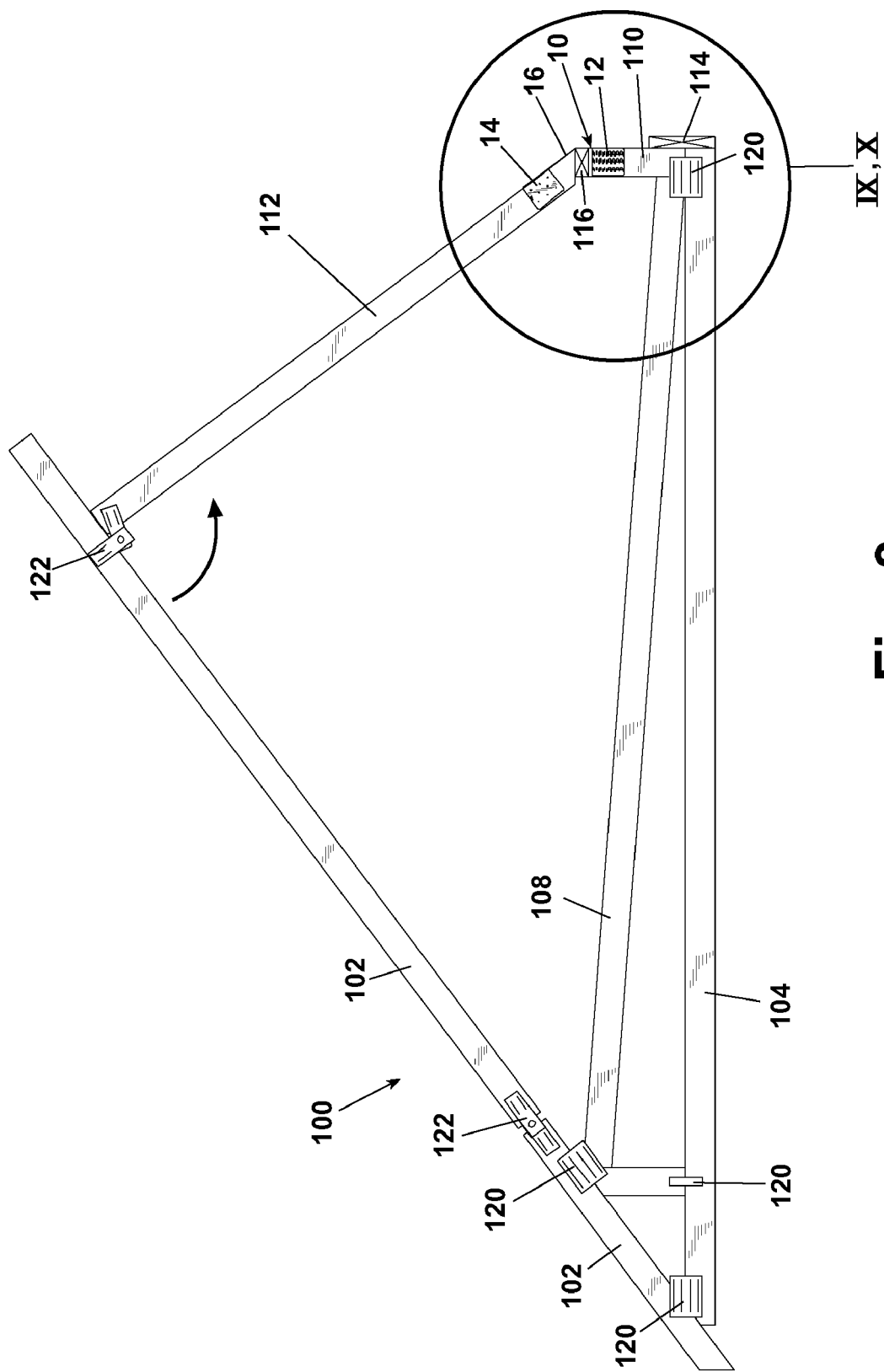
FIG. 8 is a front elevational view of the truss of FIG. 5 configured into an erect position.
Figure 9:
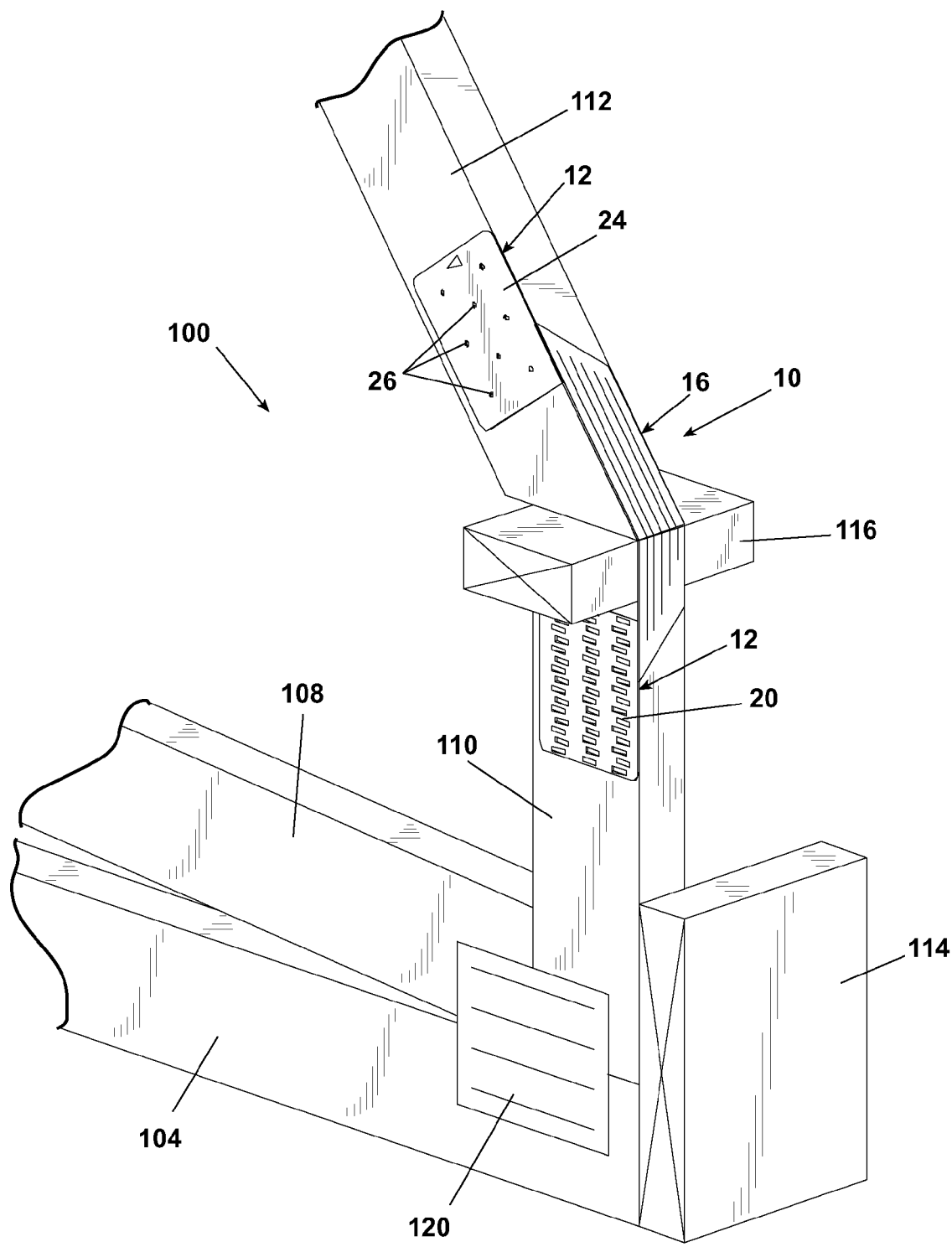
FIG. 9 is an enlarged perspective view of the area marked IX in FIG. 8.
Figure 10:
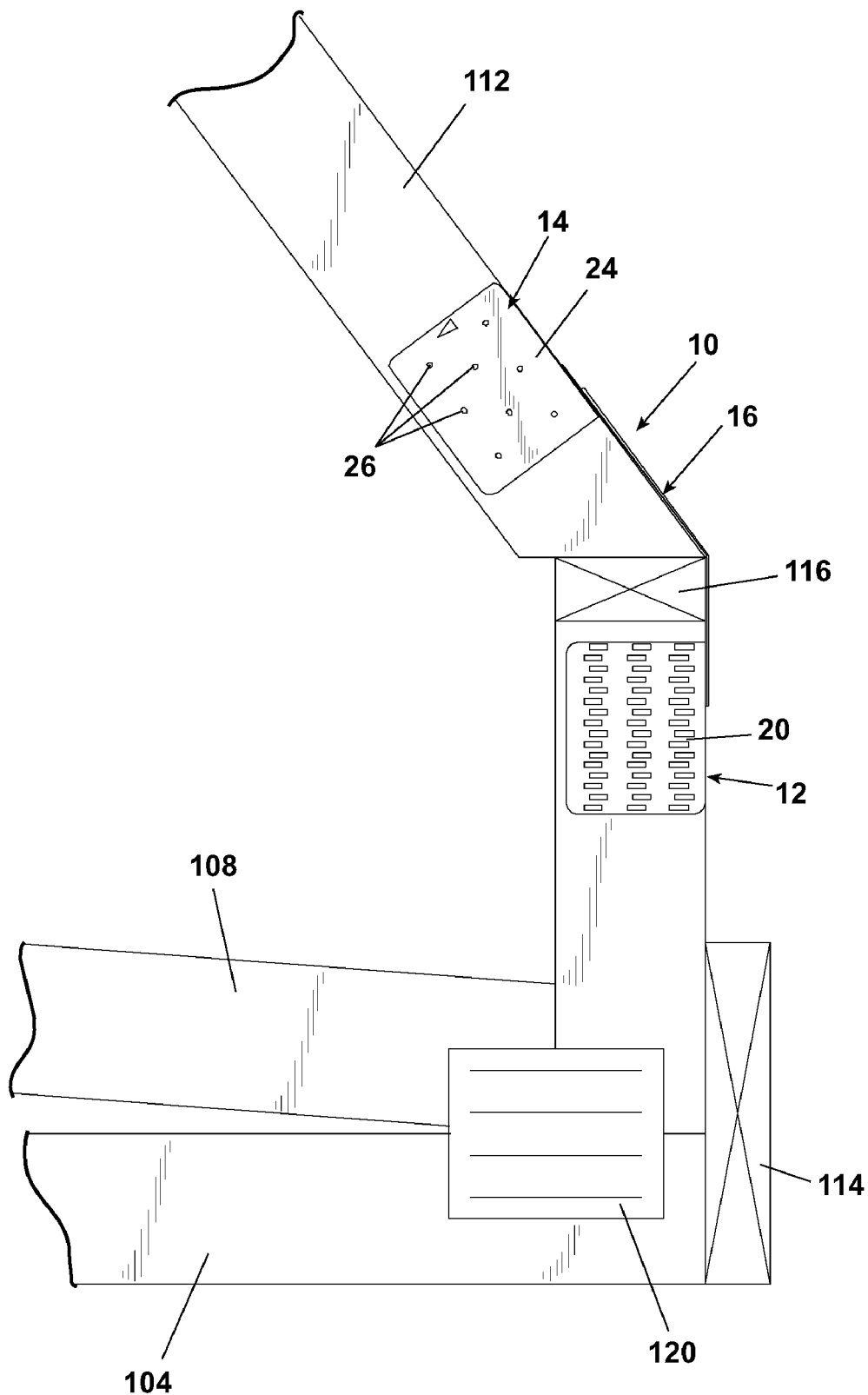
FIG. 10 is an enlarged front elevational view of the area marked X in FIG. 8.

Now with reference to FIGS. 8–10, the roof truss 100 as shown in FIG. 8 is positioned into the erected position by swinging the upper top chord 102 about the first hinge plate 122 and swinging the knee wall 112 about the second hinge plate 122 until they are into position as shown in FIG. 8. When the knee wall 112 is so positioned, its lower end is received adjacent to the plate 24 on the second engagement portion 14 of the connector 10 which had been previously mounted to the kingpost 110. The second engagement portion 14 can thereby be more fixedly mounted to the lower end of the knee wall 112 by passing fasteners through the apertures 26 and the plate 24 of the second engagement portion 14. The temporary fastening tab 28 can be temporarily pressed into the wood making up the knee wall 112 to assist an installer in positioning the second engagement portion 14 of the connector 10 with respect to the lower end of the knee wall 112. The temporary fastening tab 28 can also be used during the truss manufacturing process to temporarily secure the first engagement portion 12 to the kingpost 110. The strap web 16 is preferably folded over the top of the kingpost 110 and the first engagement portion 12 would be secured to the opposite side of the knee wall 110 whereby the connector 10 is secured during truss handling and transportation to the home manufacturing facility and/or final installation site.

Figure 11:
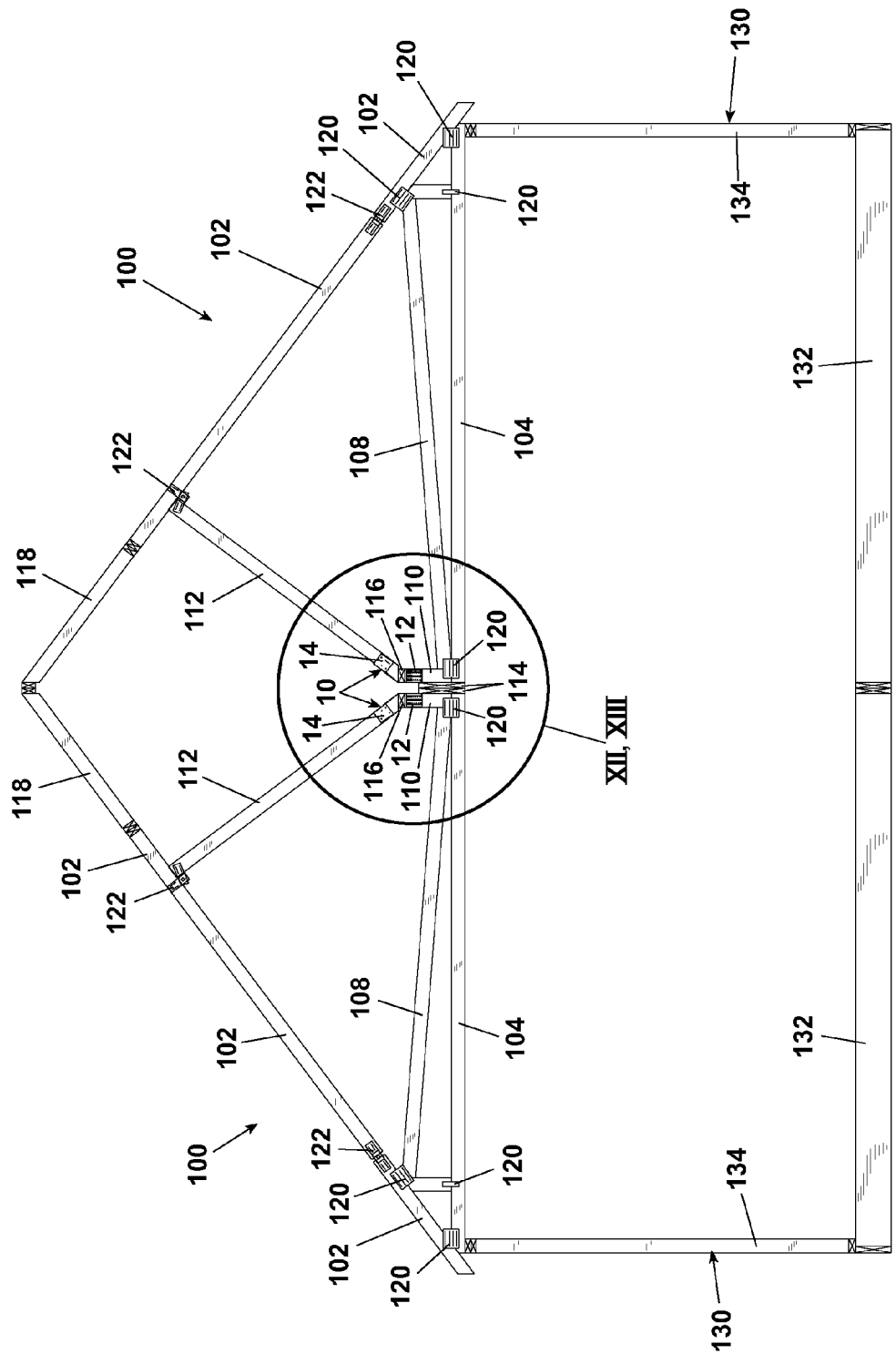
FIG. 11 is a front elevational view of a pair of juxtaposed trusses of FIG. 8 in the erect position mounted atop a housing frame to form a roof portion thereof.
Figure 12:
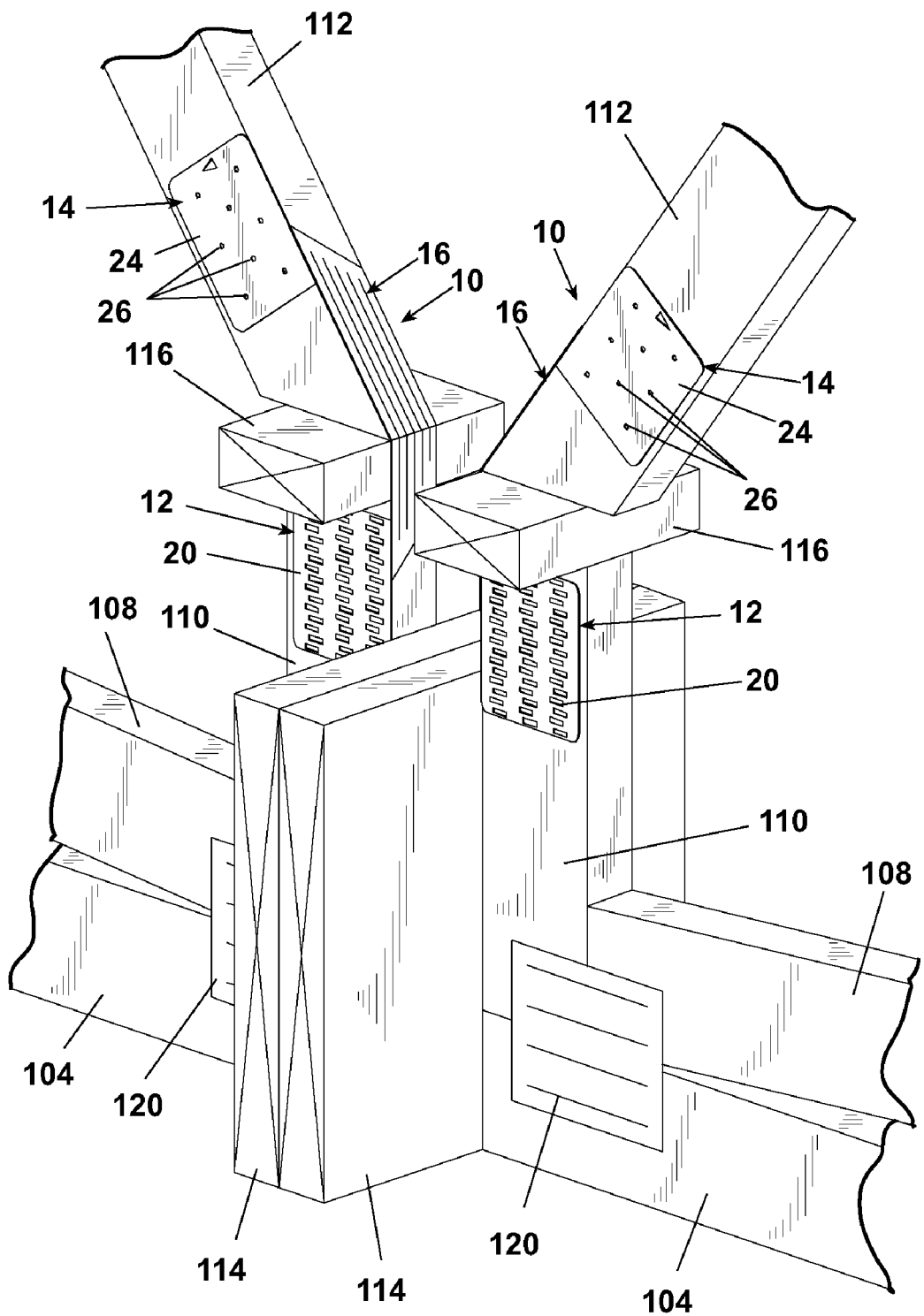
FIG. 12 is an enlarged perspective view of the area marked XII in FIG. 11.
Figure 13:
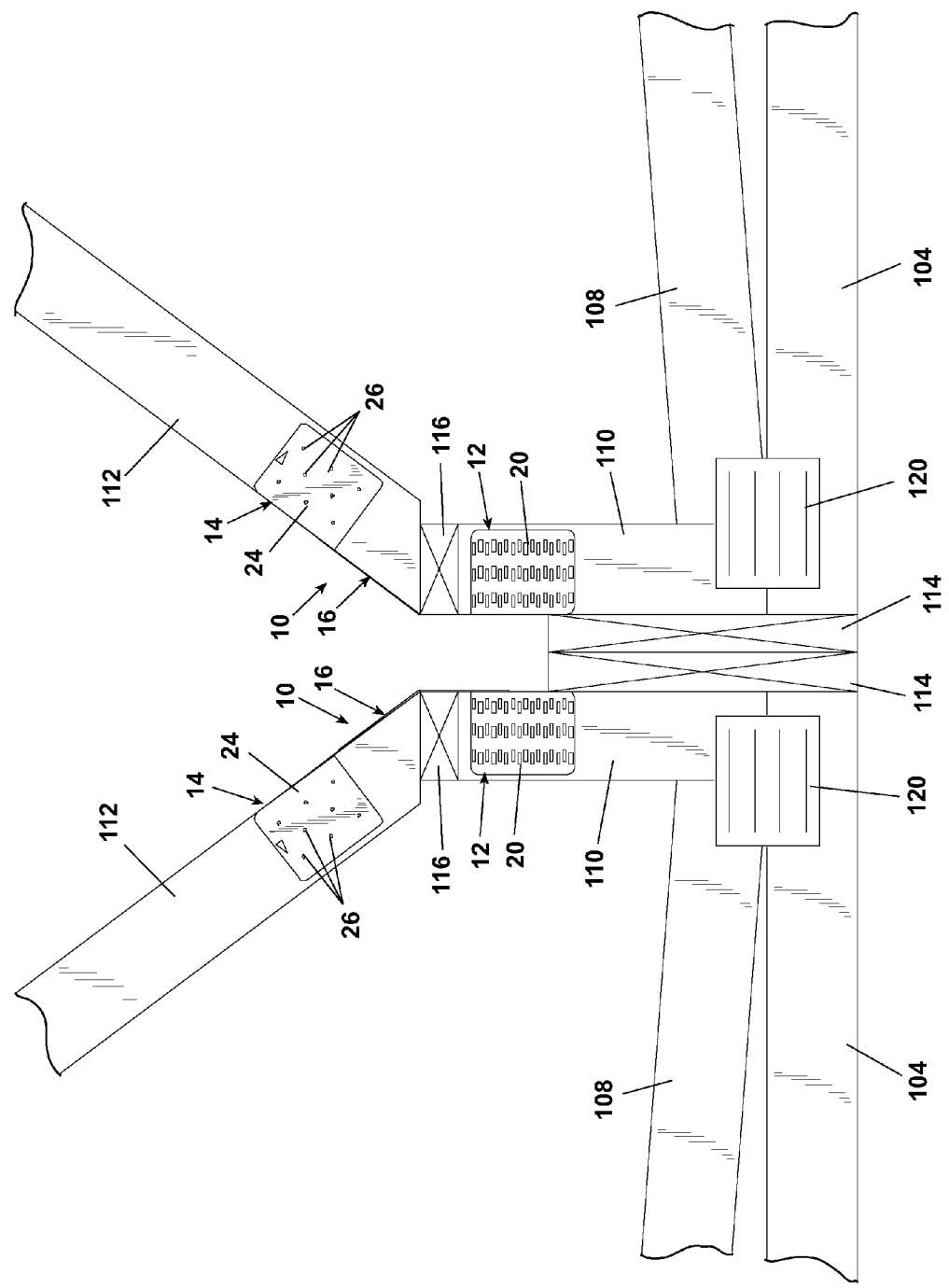
FIG. 13 is an enlarged front elevational view of the area marked XIII in FIG. 11.

FIGS. 11–13 illustrate the collapsible roof truss 100 of FIGS. 5–10 used in conjunction with a pair of peak chords 118 to form an entire generally isosceles triangular roof truss assembly with a pair of opposed roof trusses 100 set a top a stud wall 130 having a floor joist 132 and upstanding walls 134 around its perimeter. As can be seen best in FIG. 11, a pair of the connectors 10 are used atop each kingpost 110 to form the junction between the kingpost 110, the knee wall 112 and optional runner rail 116.

FIGS. 14–16 and 17–19 illustrate a Cape Cod-style roof truss 100 movable between a collapsed and an erected state, respectively. The construction of the Cape Cod-style roof truss is very similar to the embodiment described in the previous FIGS. 5–14 except for some minor differences in construction, such as the knee walls 112 are mounted in a vertical orientation and a collar tie 110' as shown best in FIG. 17 which interconnects the upper end of each of the upper top chords 102 in a horizontal configuration.

Figure 14:
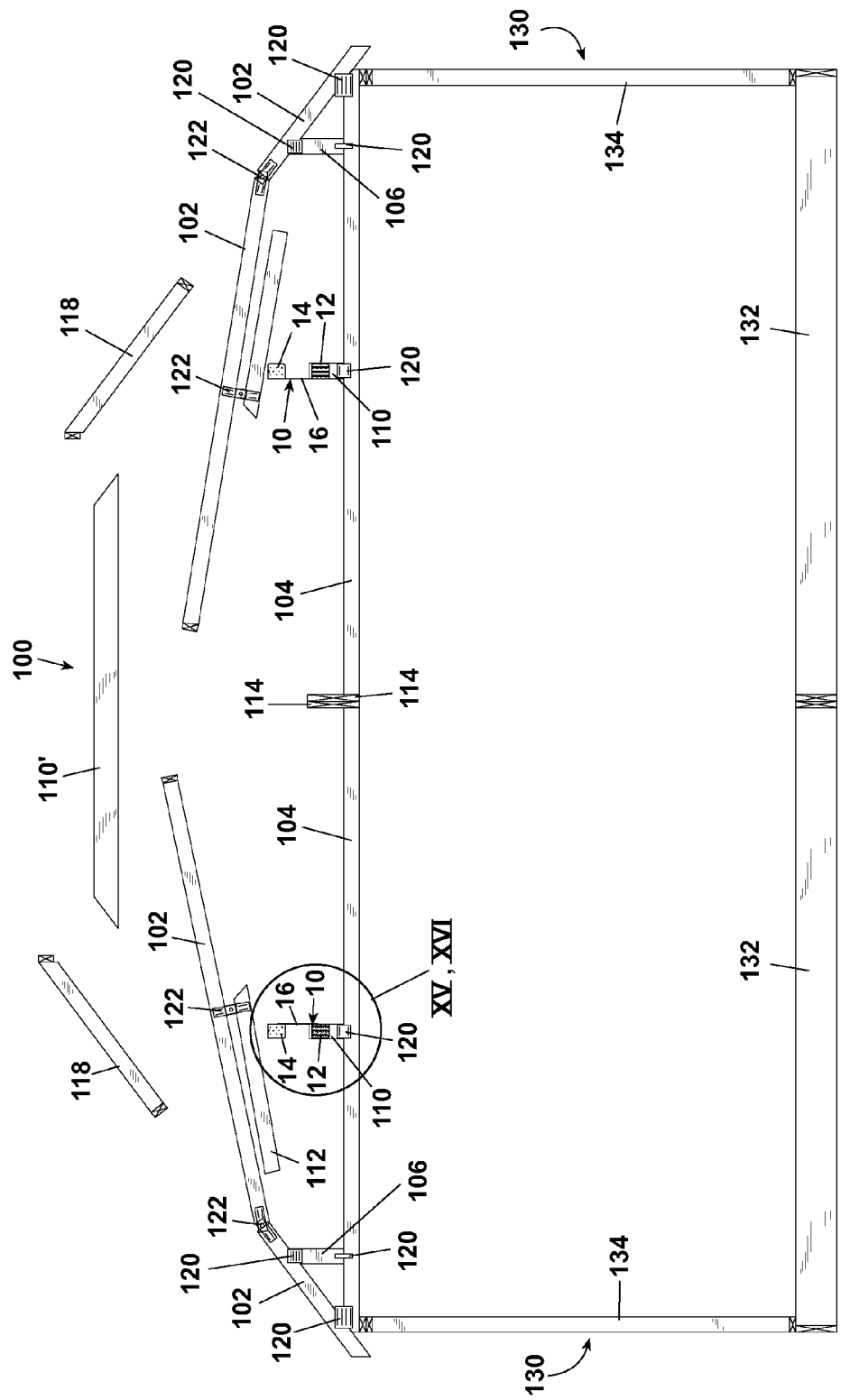
FIG. 14 is a front elevational view of a Cape Cod-style roof truss shown atop a housing frame in a disassembled state, wherein bottom chords of the roof truss have tiedown straps of FIGS. 1–4 mounted thereto.
Figure 15:
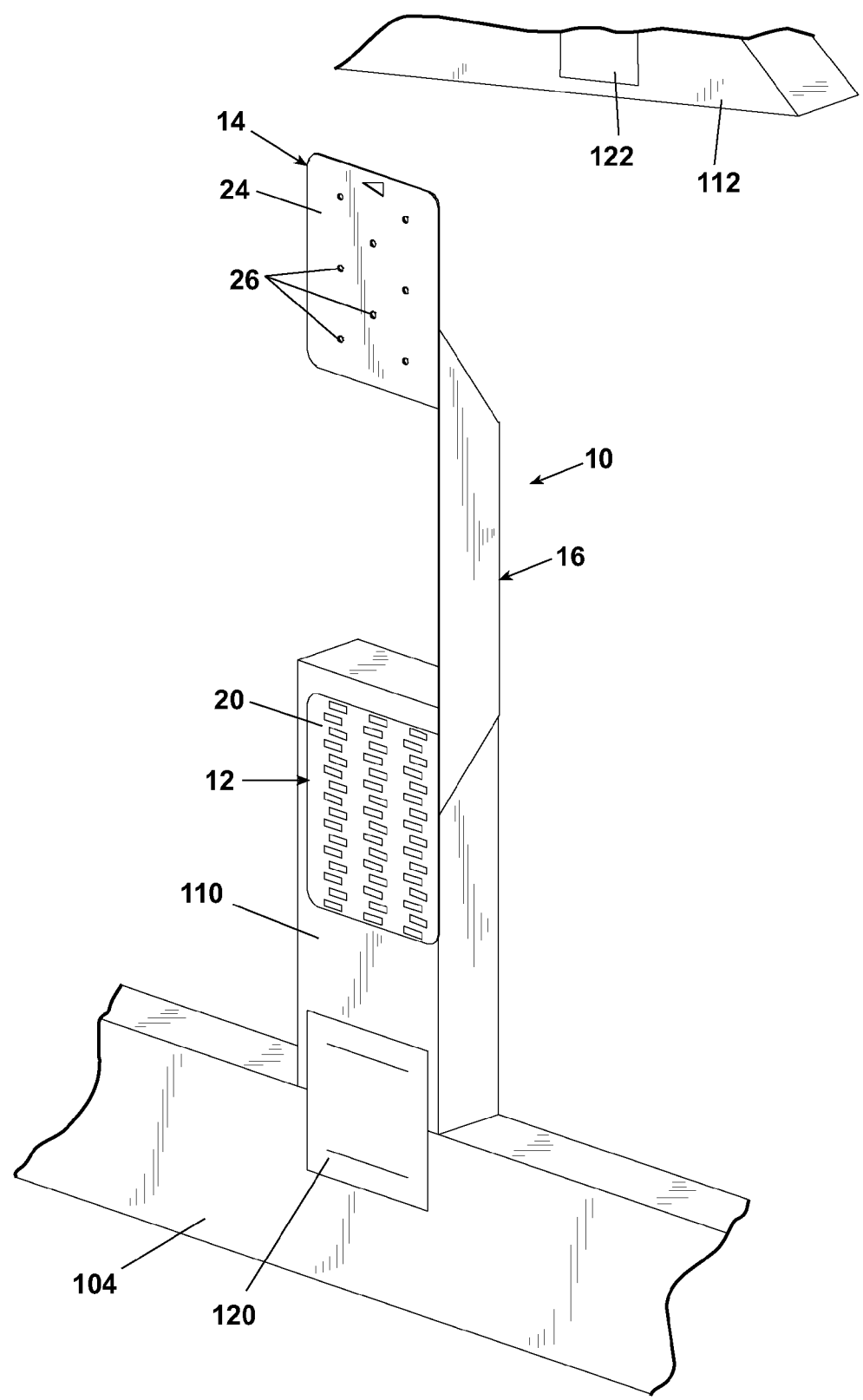
FIG. 15 is an enlarged perspective view of the area marked XV in FIG. 14.
Figure 16:
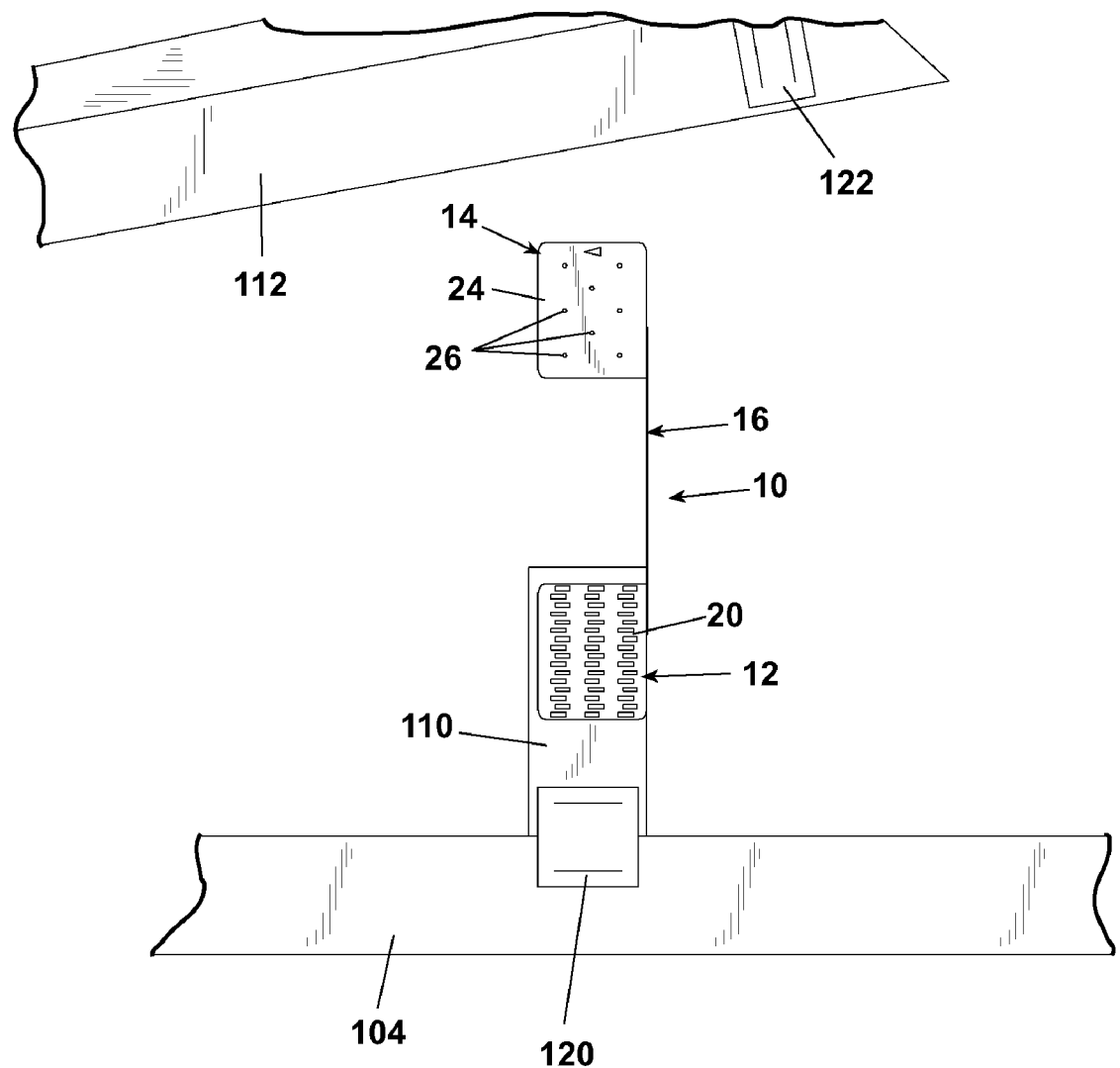
FIG. 16 is an enlarged front elevational view of the area marked XVI in FIG. 14.
Figure 17:
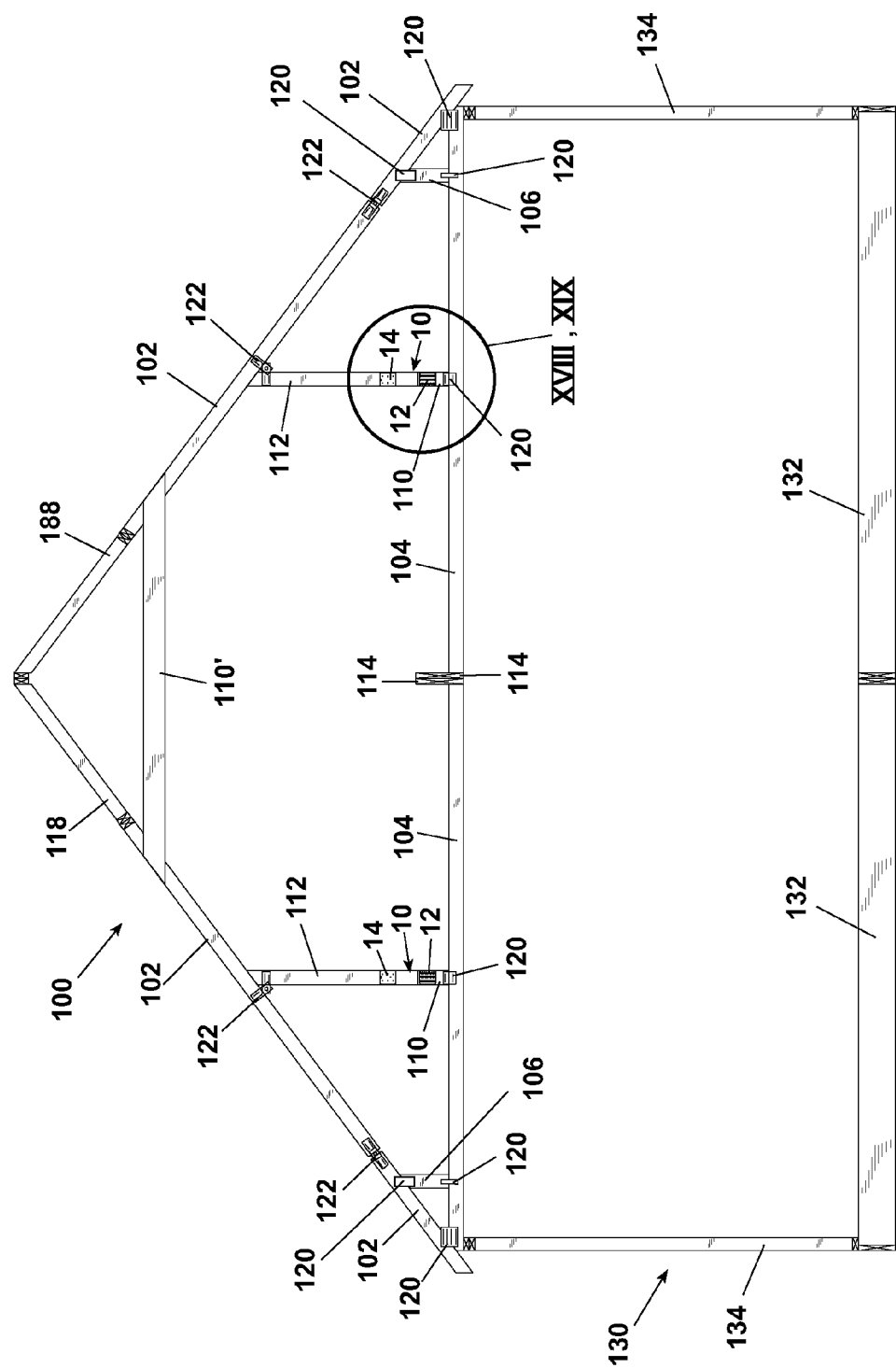
FIG. 17 is a front elevational view of the truss of FIG. 14 configured into an erect position.
Figure 18:
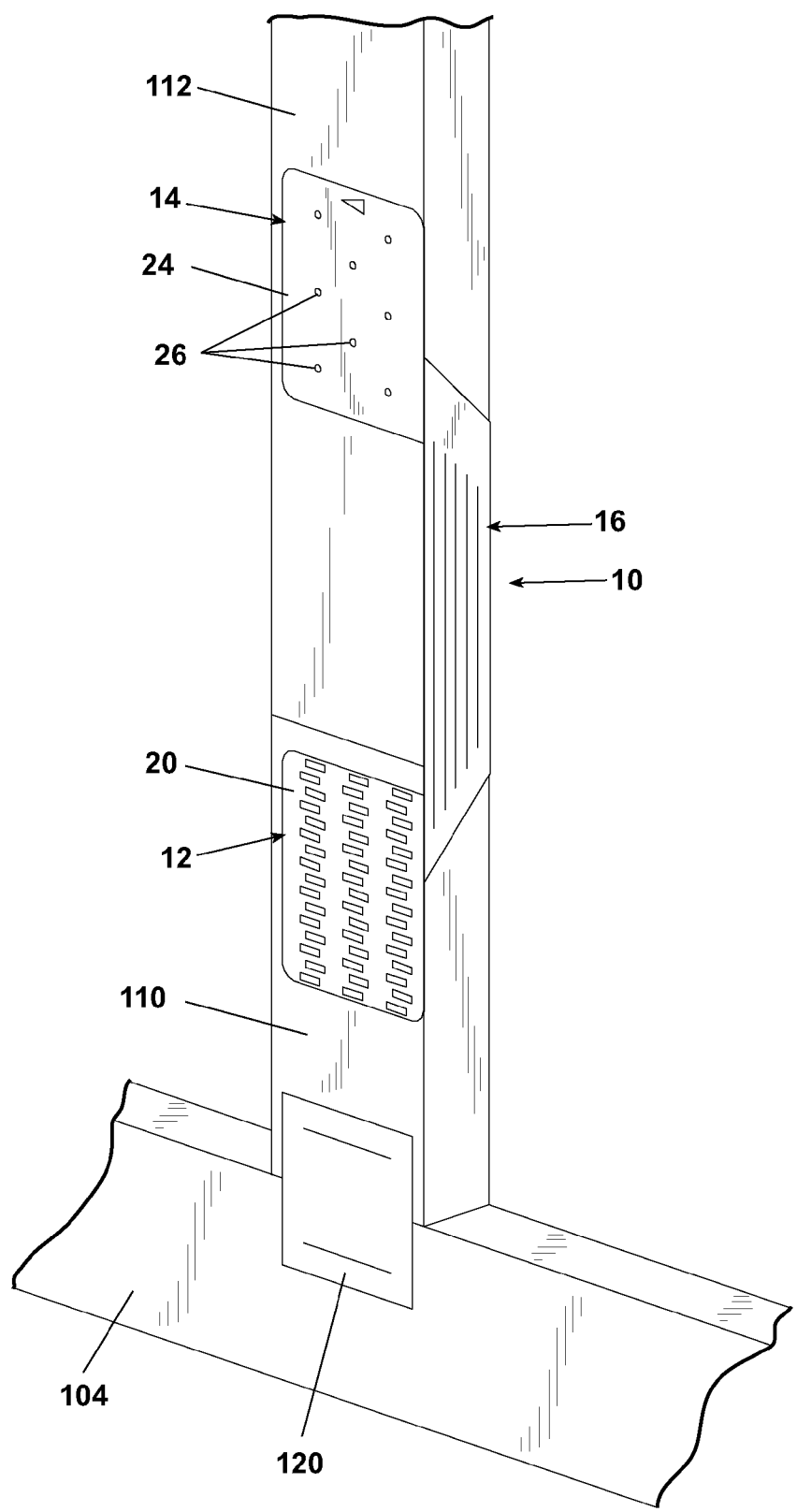
FIG. 18 is an enlarged perspective view of the area marked XVIII in FIG. 17.
Figure 19:
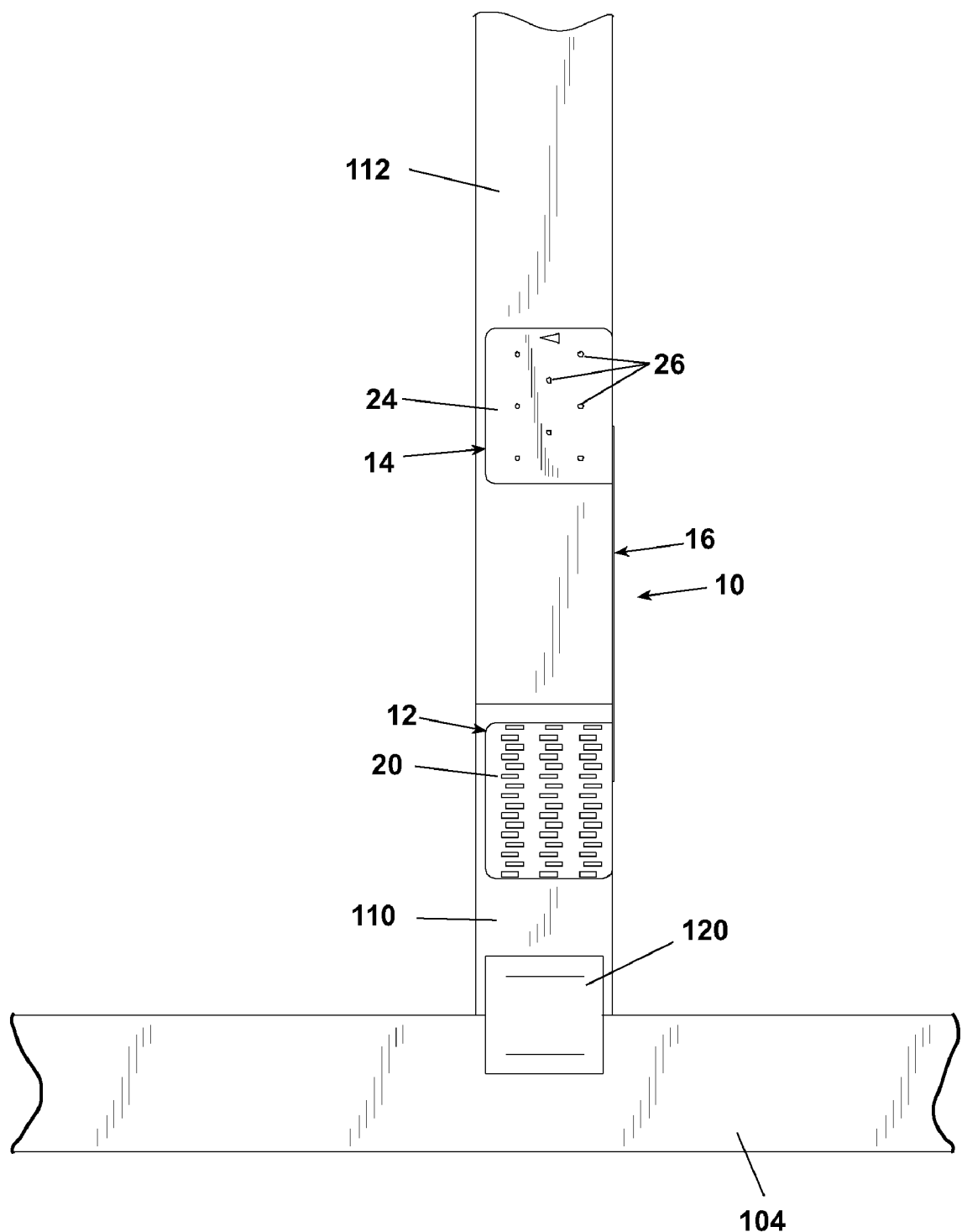
FIG. 19 is an enlarged front elevational view of the area marked XIX in FIG. 17.
Figure 20:
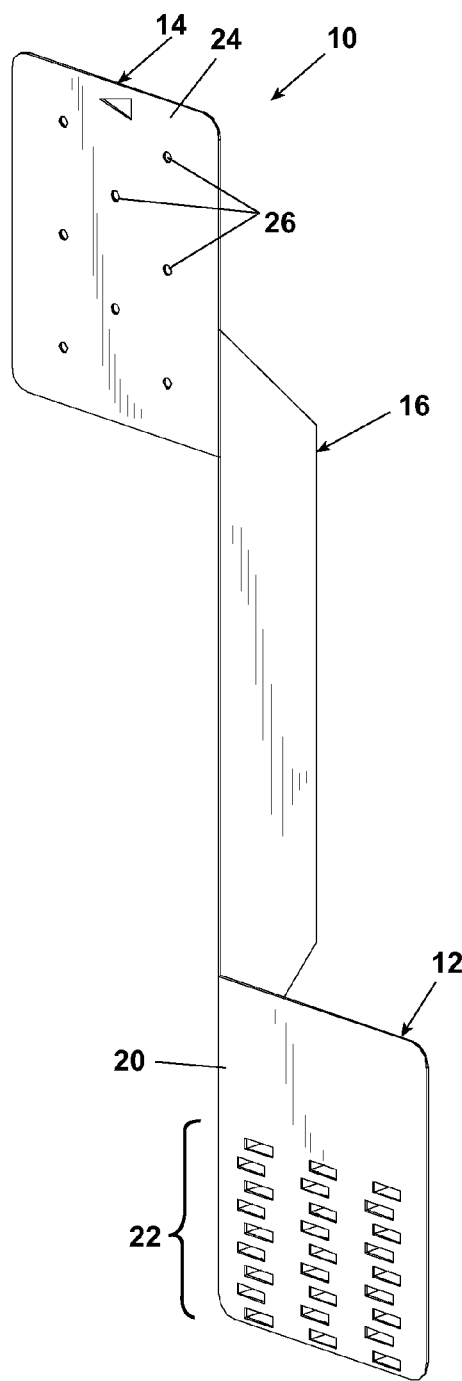
FIG. 20 is a perspective view of a second embodiment of a tie-down strap according to the invention, wherein a front elevational side of the tie-down strap is shown in detail.
Figure 21:
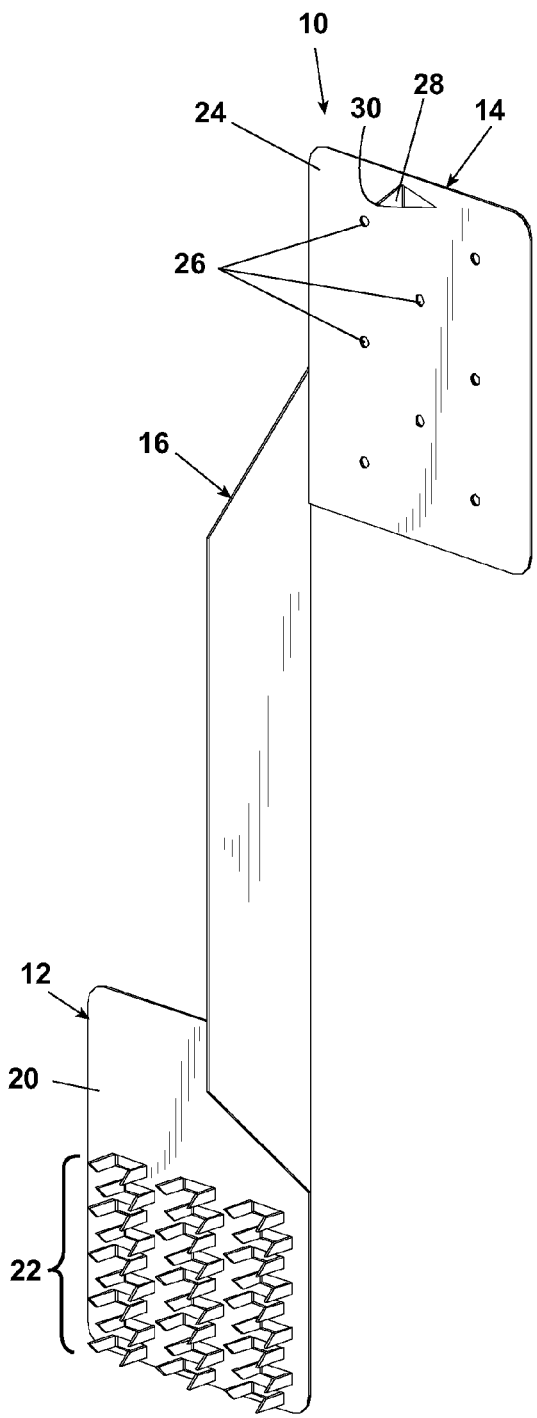
FIG. 21 is a perspective view of the second embodiment of the tie-down strap of FIG. 20, wherein a rear elevational side of the tie-down strap is shown in detail.

As can be seen in FIGS. 14 and 17, the first engagement portion 12 of the connector 10 is mounted to an upper surface of the kingpost 110 and, in this roof truss style, the web 16 of the connector 10 is in a straight (i.e., vertical) configuration. As seen best in FIGS. 17–19, the collapsed state of the roof truss 100 in FIGS. 14–16 can be moved from the collapsed state to the erected state by swinging the upper top chord 102 upwardly about the first hinge plate 122 and between the knee wall 112 downwardly into alignment with the second engagement portion 14 of the connector 10. The collar tie 110' interconnects the upper end of the upper top chords 102 and provides support for the peak chords 118 forming the crown of the roof truss 100. The mounting of the connector 10 to the kingpost 110 and to the knee wall 112 to form the knee wall-kingpost junction is as previously described.

A second embodiment of the connector 10 is shown by example in FIGS. 20–23. It will be understood that like elements between the first embodiment of FIGS. 1–4 and the second embodiment of FIGS. 20–23 are referred to with identical reference numerals. The only difference between the first and second embodiment of FIGS. 1–4 and 20–23, respectively, is that the first and second engagement portions 12 and 14 are configured in an S-shaped configuration whereby the web 16 is generally aligned along a medial vertical axis of the connector 10 and the first engagement portion 12 extends orthogonally from this vertical axis in a first lateral direction and the second engagement portion 12 extends orthogonally from this vertical axis in a second lateral direction. Preferably, the first and second engagement portion 12 and 14 are plainly aligned with one another on the web 16. This configuration of the connector 10 is useful in areas where an offset alignment of various chord members of a roof truss 100 must be employed due to state limitations, profile requirements and the like. The S-shaped configuration also allows a runner rail 116 to pass unobstructed adjacent to the top portion of the first engagement portion 12 having no fasteners 22 pre-punched into the plate 20. This configuration is shown by example in FIG. 28.

Figure 24:
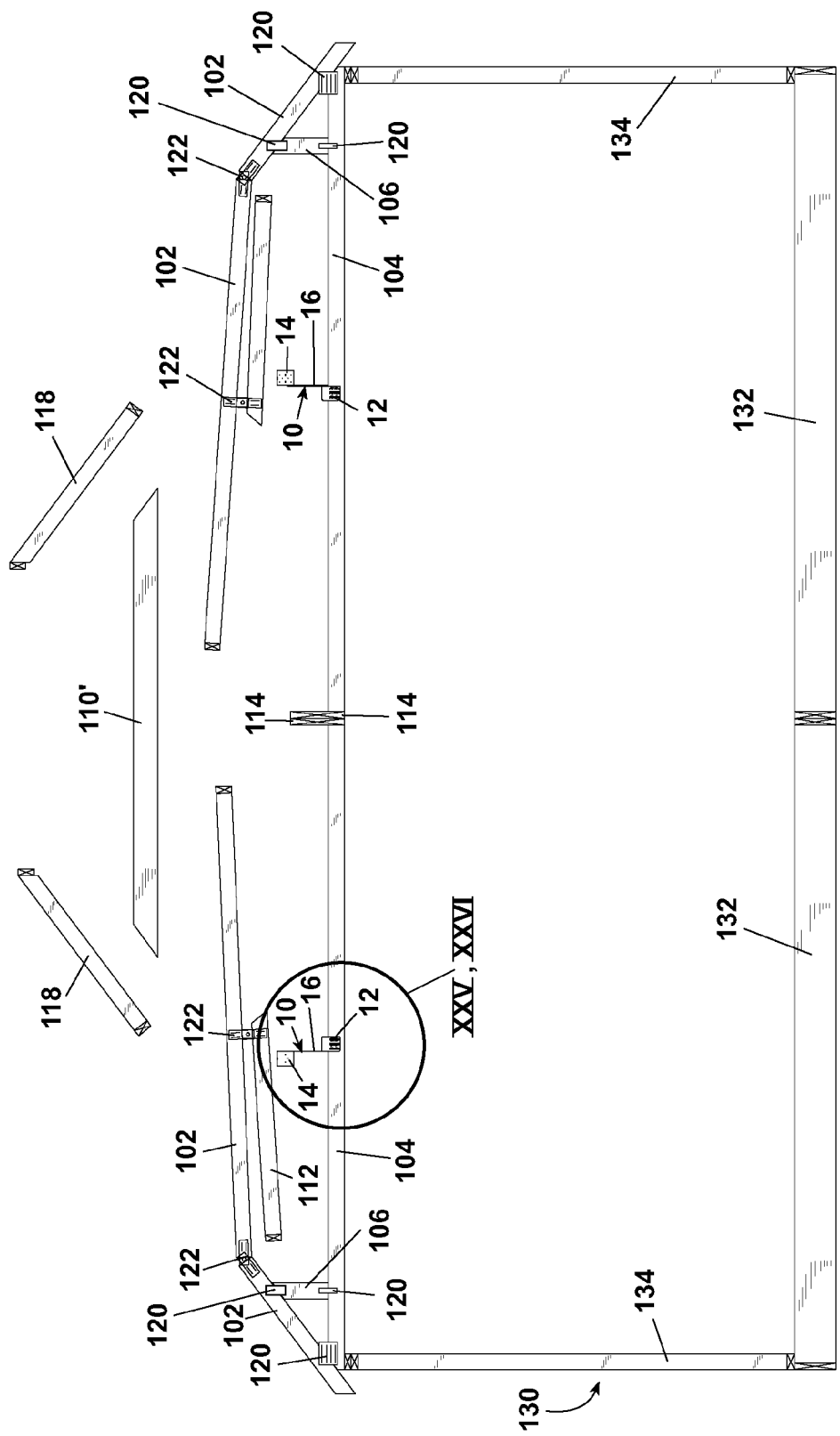
FIG. 24 is a front elevational view of a Cape Cod-style roof truss shown atop a housing frame in a disassembled state, wherein bottom chords of the roof truss have tie-down straps of FIGS. 20–23 mounted thereto.
Figure 25:
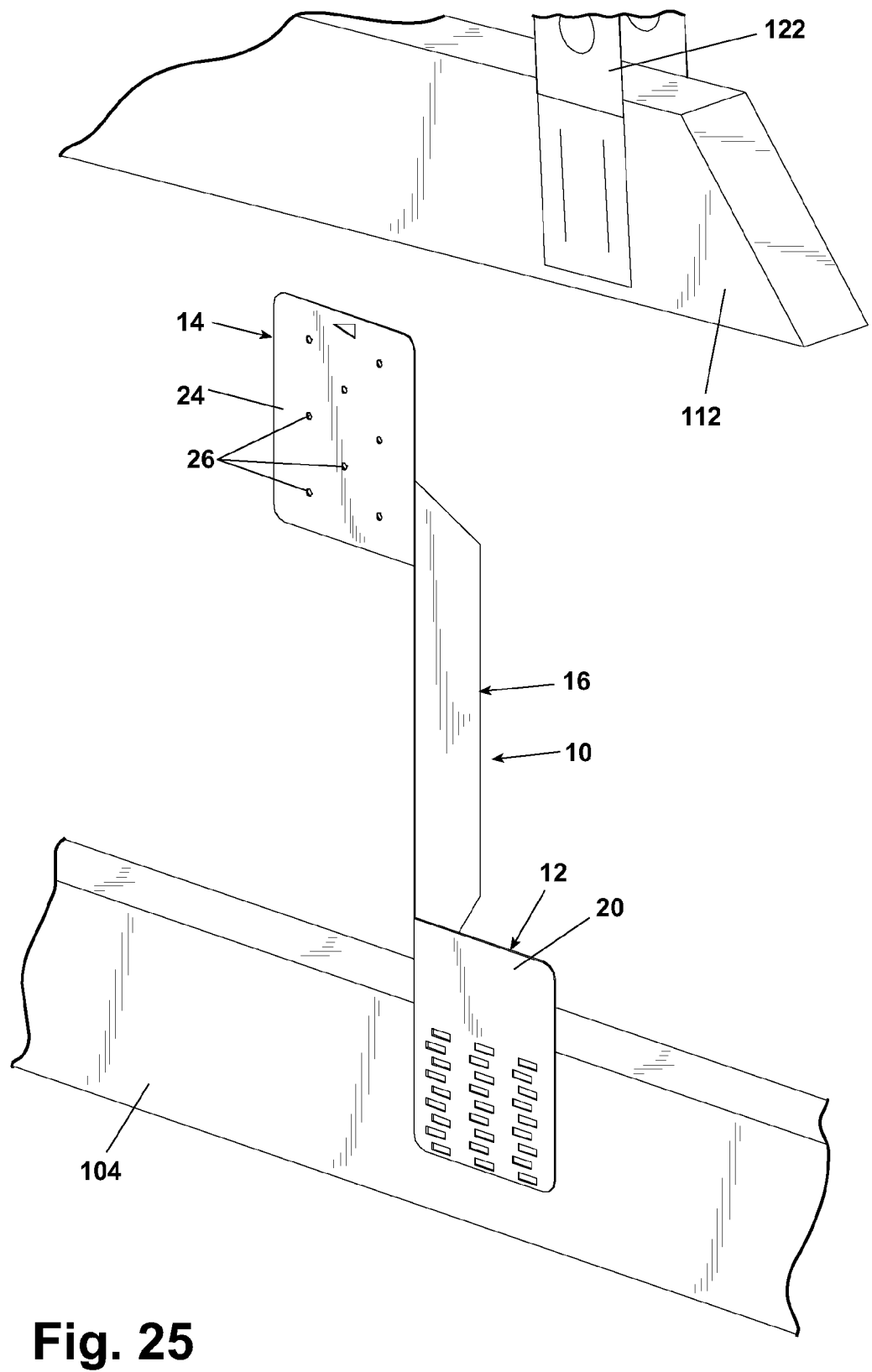
FIG. 25 is an enlarged perspective view of the area marked XXV in FIG. 24.
Figure 26:
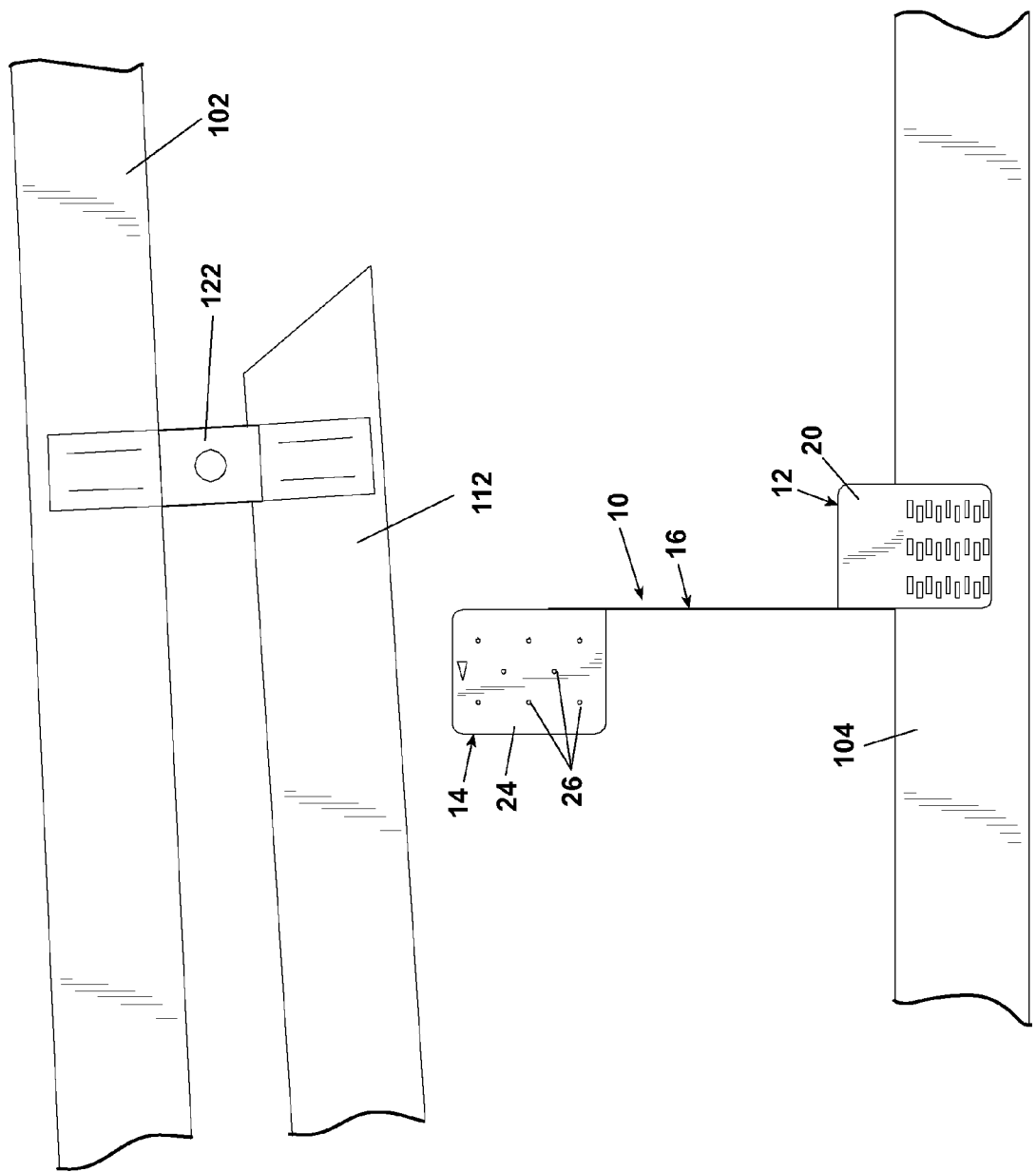
FIG. 26 is an enlarged front elevational view of the area marked XXVI in FIG. 24.
Figure 27:
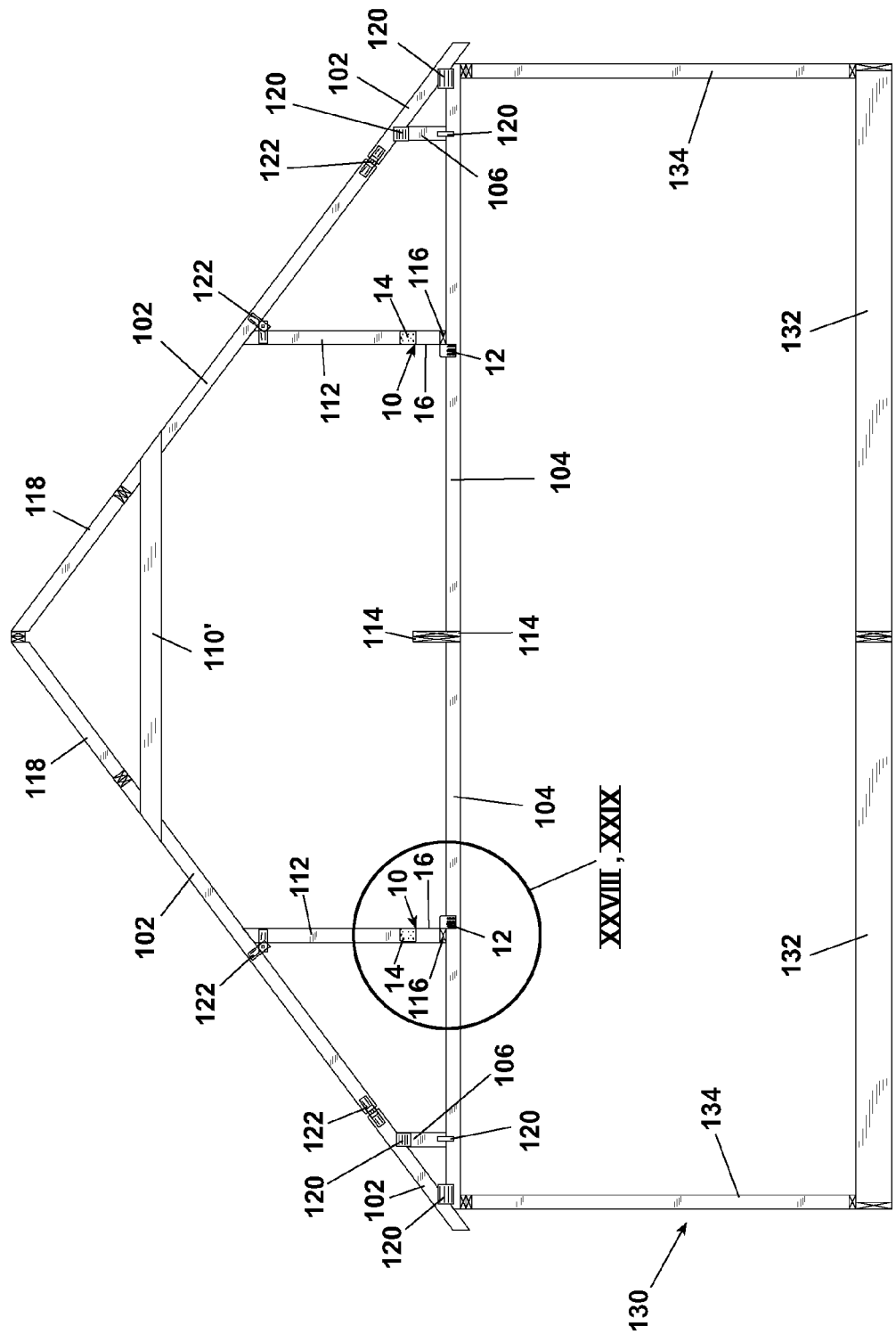
FIG. 27 is a front elevational view of the truss of FIG. 24 configured into an erect position.
Figure 28:
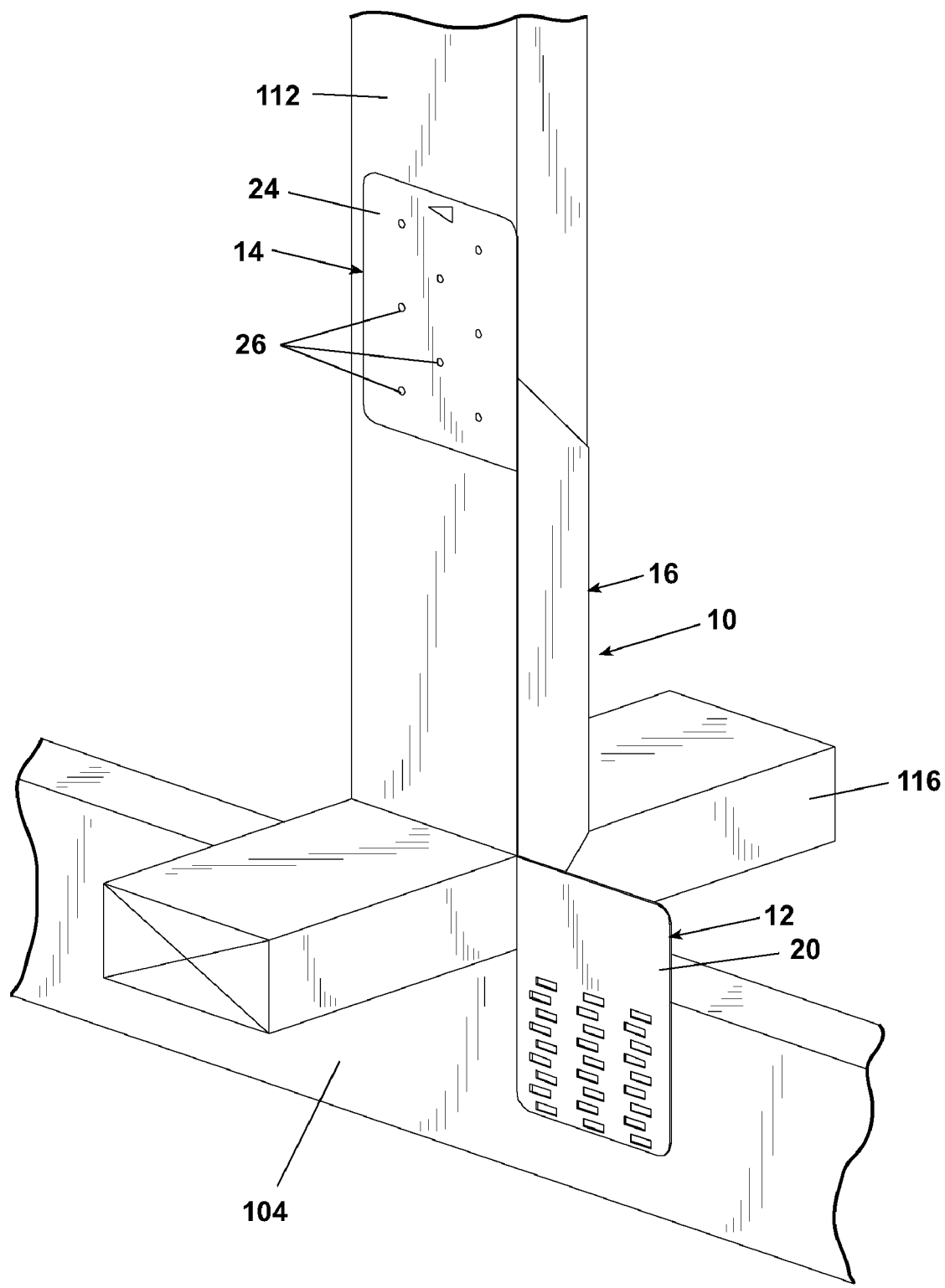
FIG. 28 is an enlarged perspective view of the area marked XXVIII in FIG. 27.
Figure 29:
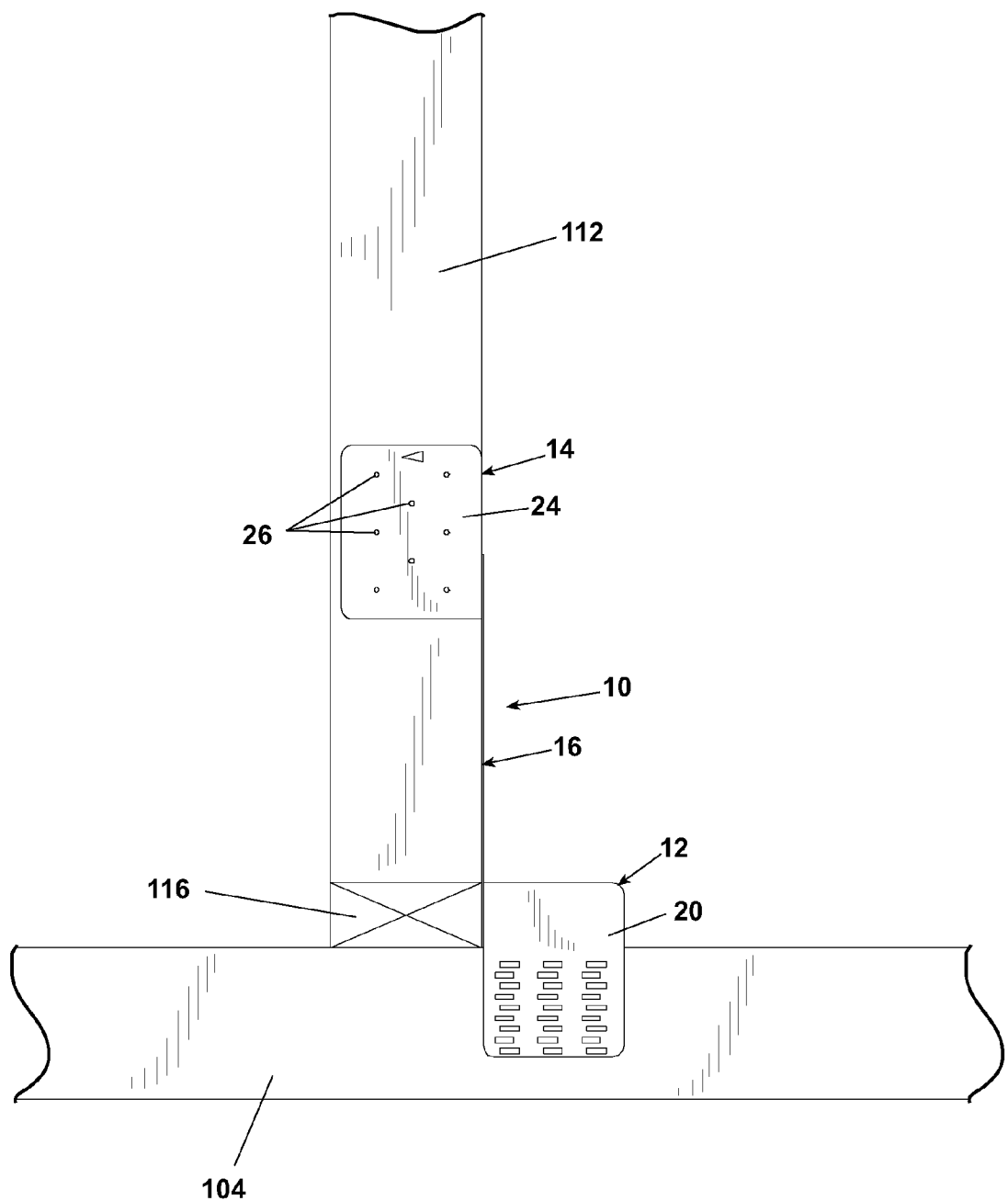
FIG. 29 is an enlarged front elevational view of the area marked XXIX in FIG. 27.
Figure 30:
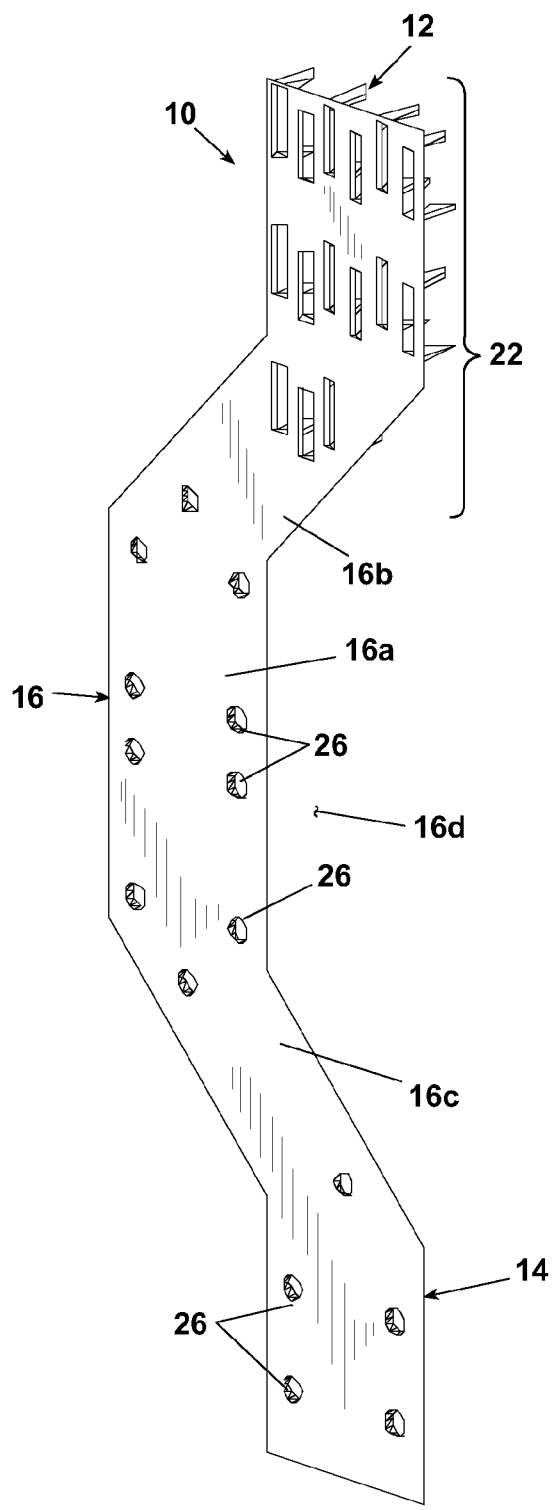
FIG. 30 is a perspective view of a third embodiment of a tie-down strap according to the invention, wherein a front elevational side of the tie-down strap is shown in detail.
Figure 31:
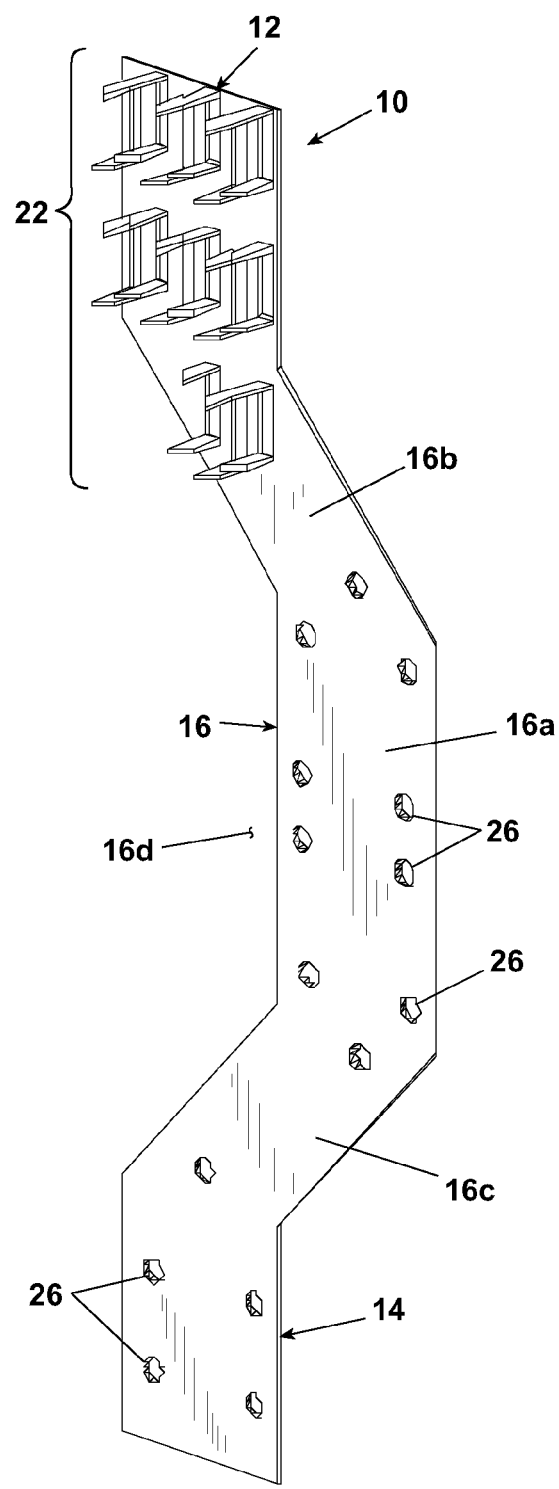
FIG. 31 is a perspective view of the third embodiment of the tie-down strap of FIG. 30, wherein a rear elevational side of the tie-down strap is shown in detail.

An example of a roof truss 100 employing the second embodiment of the connector 10 shown in FIGS. 20–23 is shown in a collapsed state and FIGS. 24–26 and in an erected state in FIGS. 27–29. The construction of this roof truss 100 shown in FIGS. 24–29 is very similar to that shown in FIGS. 14–19 except that the kingpost 110 has been eliminated in favor of a direct connection by the connector 10 to the bottom chord 104 in each case. As can best be seen in FIGS. 24–26, the first engagement portion 12 of the connector 10 is connected directly to a vertical surface of the bottom chord 104 in a manner consistent with that described previously with respect to the mounting of the first engagement portion 12 to an upper portion of the kingpost 110.

The roof truss 100 would thereby be shipped to an on-site installation location with the connector 10 extending upwardly therefrom. Turning to FIGS. 27–29, the upper top chord 102 is swung about the first hinge plate 122 and the knee wall 112 is positioned into a vertical orientation and alignment with the second engagement portion 14 of the connector 10. The second engagement portion 14 is thereby mounted to the knee wall 112 as previously described. As can be seen in FIG. 28, the second embodiment of the connector 10 is useful in "jogging" around various chords making up the roof truss 110 such as the runner rail 116 around which the connector 10 passes as shown in FIG. 28.

A third embodiment of the connector 10 is shown by example in FIGS. 30–33. It will be understood that like elements between the first and second embodiments of FIGS. 1–29 and the third embodiment of FIGS. 30–33 are referred to with identical reference numerals. A difference between the earlier embodiments of FIGS. 1–29 and the third embodiment of FIGS. 30–33, respectively, is that the connector 10 in the earlier embodiments has a generally linear web 16 whereby the web 16 of the third embodiment of FIGS. 30–33 has a side step configuration. This side step configuration has a web 16 having an elongated body 16a interconnected to the first and second engagement portions 12 and 14 by angular webs 16b and 16c, respectively.

The first and second engagement portions 12 and 14 are maintained in generally linear alignment with one another as the angular webs 16b and 16c laterally offset the elongated body 16a from this linear alignment, creating a recess 16d between the web portions 16a, 16b and 16c and between the first and second engagement portions 12 and 14. It will be understood that it is not critical to this invention that the first and second engagement portions 12 and 14 be maintained in linear alignment and that different configurations and alignments of the first and second engagement portions are contemplated without departing from the scope of this invention. This configuration of the connector 10 is useful in areas where an internal chord member of a roof truss creates an obstruction to the interconnection of a pair of roof truss chords, in that the side step configuration of the third embodiment of the connector 10 can be used to conveniently traverse an obstructing and/or intervening chord member as described below with respect to FIGS. 34–36.

Figure 34:
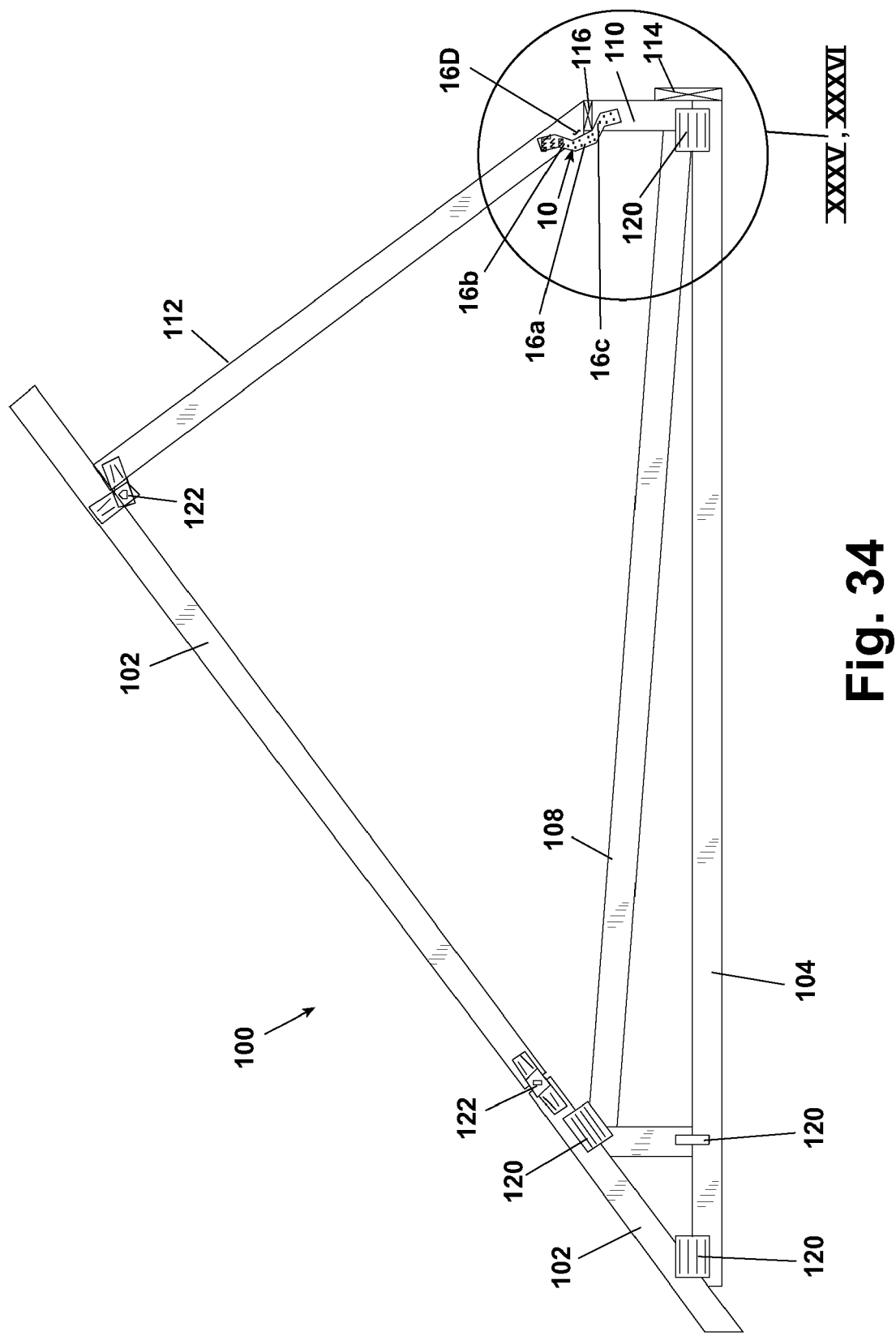
FIG. 34 is a front elevational view of a roof truss for mounting atop a housing frame in an erect position, wherein internal chords of the roof truss have a tie-down strap of FIGS. 30–33 mounted thereto.
Figure 36:
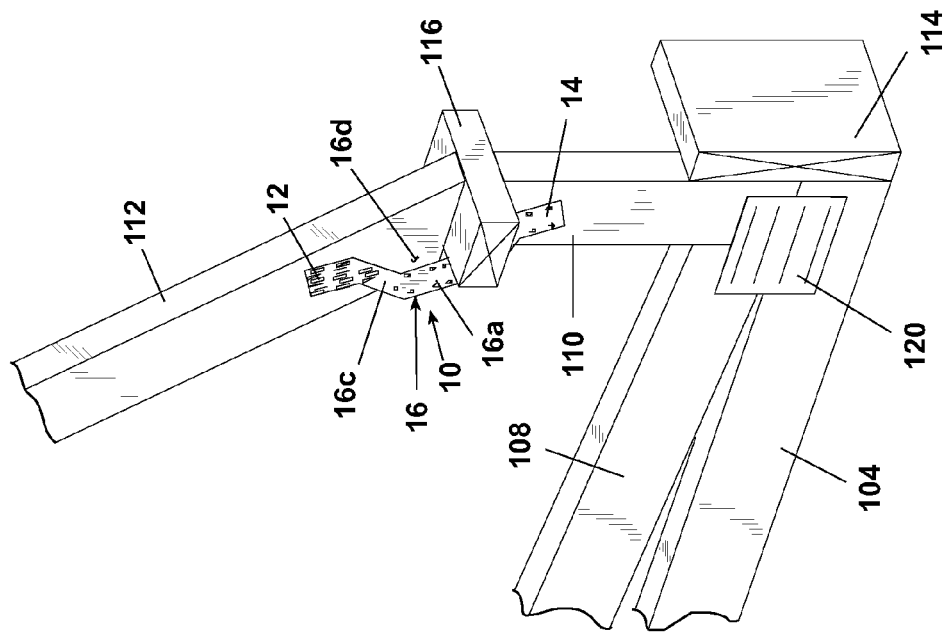
FIG. 36 is an enlarged front perspective view of the area marked XXXVI in FIG. 34.
Figure 35:
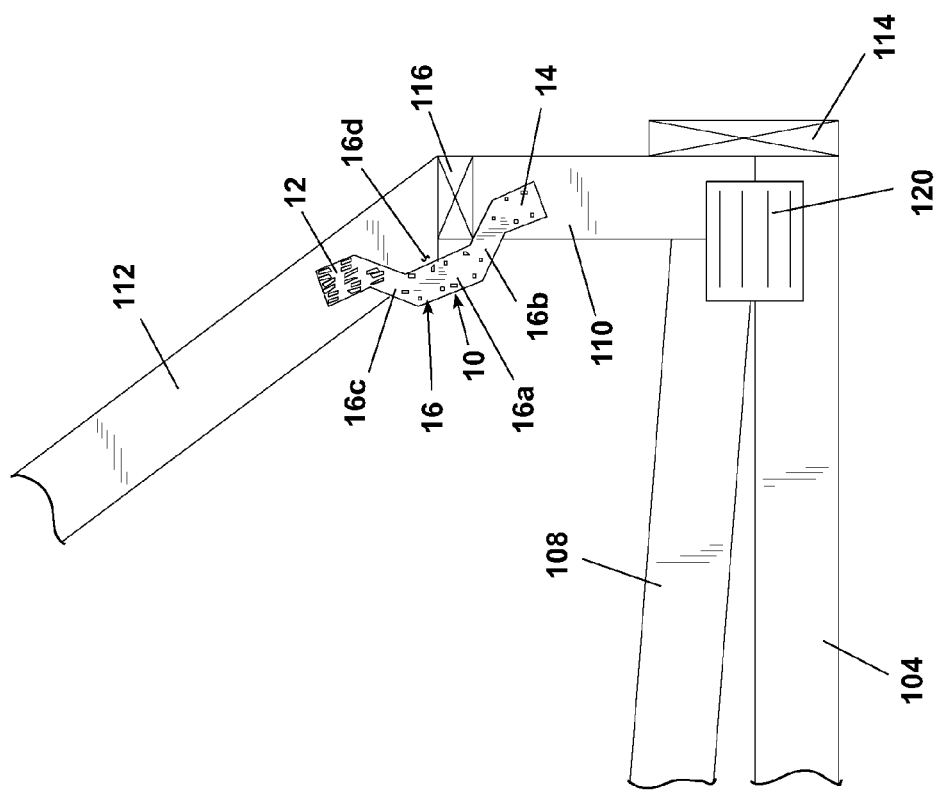
FIG. 35 is an enlarged elevational view of the area marked XXXV in FIG. 34.

An example of a roof truss 100 employing the third embodiment of the connector 10 shown in FIGS. 30–33 is shown FIGS. 34–36. It will be understood that the roof truss 100 of FIGS. 34–36 can be collapsed and erected in similar manner to the roof trusses shown and described earlier in FIGS. 1–29. As can best be seen in FIGS. 24–26, the first engagement portion 12 of the third embodiment of the connector 10 is connected directly to a vertical surface adjacent a lower end portion of the knee wall 112 in an integral manner consistent with that described previously with respect to the earlier embodiments.

Typically after connection of the connector 10 to the knee wall 112 at a manufacturing facility, the roof truss 100 would thereby be shipped in a collapsed state (due to the pivoting of the hinge plates 122 therein) to an on-site installation location. The upper top chord 102 is then swung about the first hinge plate 122 and the knee wall 112 is positioned into alignment so that the second engagement portion 14 of the connector 10 is aligned with a vertical surface adjacent a top portion of the kingpost 110. The second engagement portion 14 is thereby mounted to the kingpost 110 by any suitable fastener, such as screws or nails passed through the apertures 26 in the second engagement portion 14 and/or any apertures 26 in any portion of the web 16. As can be seen in FIGS. 34–36, the third embodiment of the connector 10 is useful in "jogging" around various chords making up the roof truss 100 such as the runner rail 116 around which the connector 10 passes as shown in FIGS. 34–36. As can be seen in these Figures, the angled web portions 16b and 16c traverse the web portion 16a around the runner rail 116 so that the runner rail 116 simply rests in the recess 16d.

Figure 37:
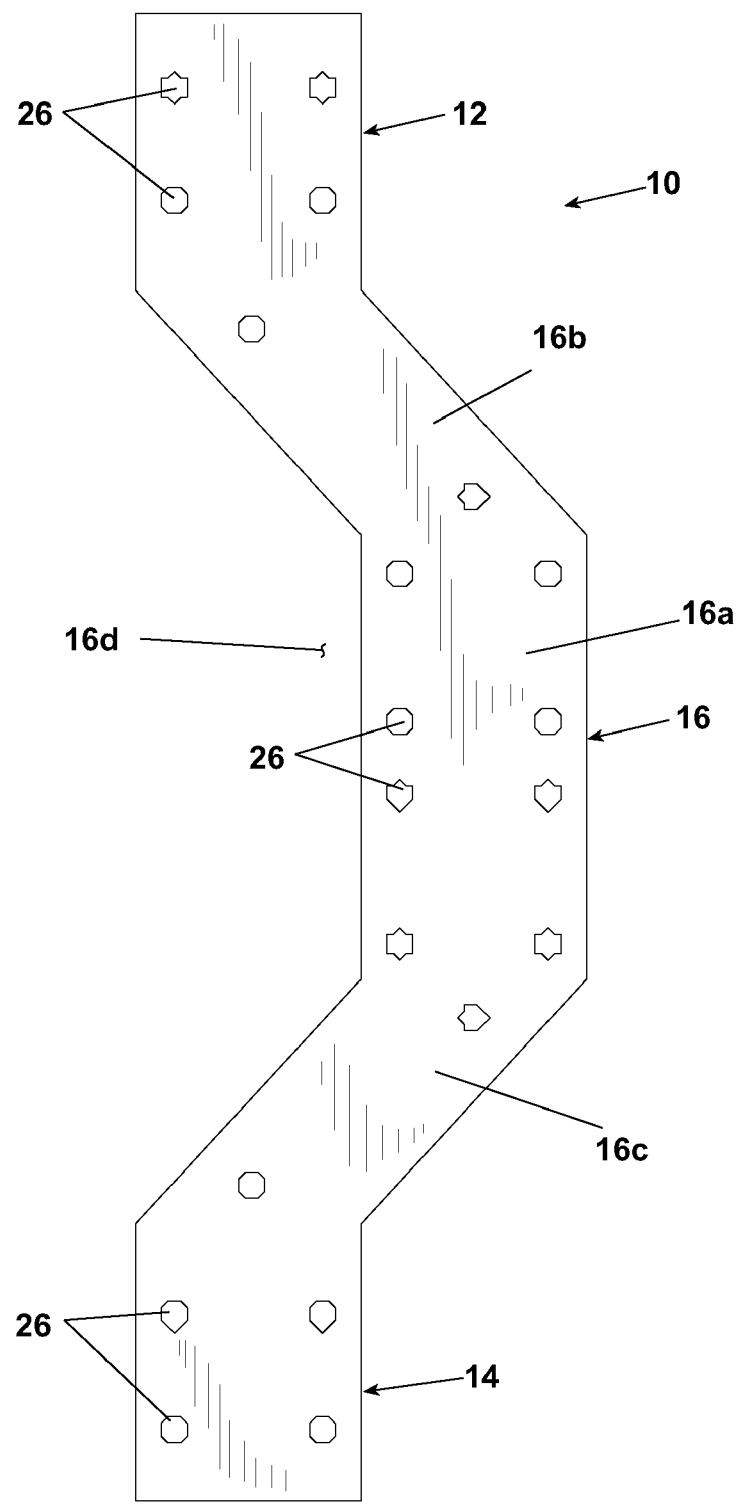
FIG. 37 is a front elevational view of a fourth embodiment of a tie-down strap according to the invention.
Figure 38:
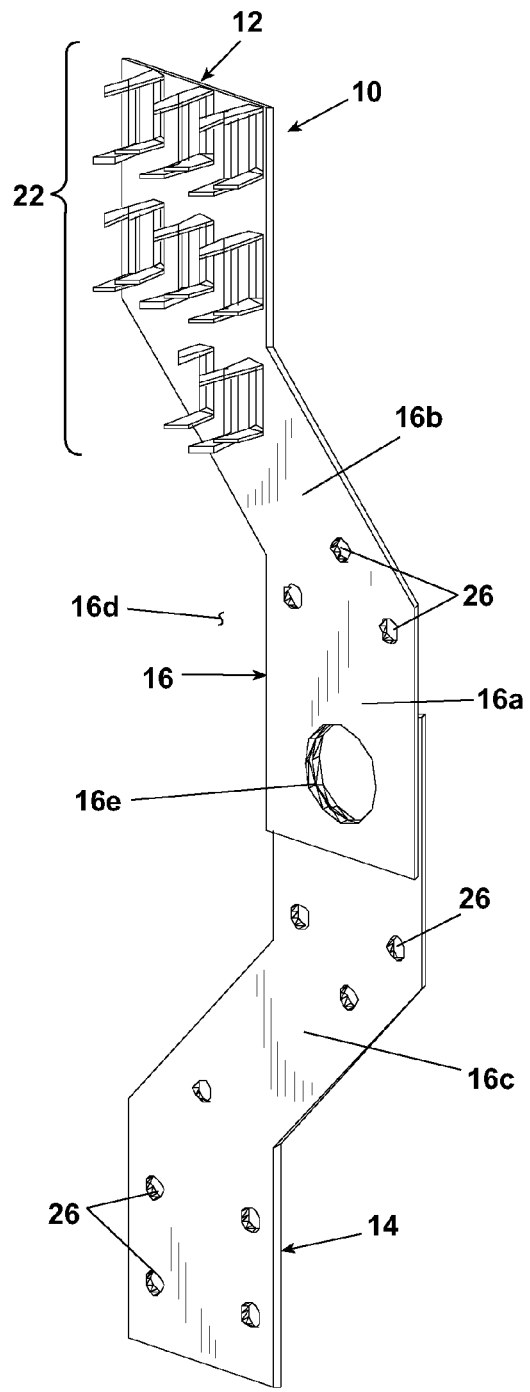
FIG. 38 is a perspective view of a fifth embodiment of a tie-down strap according to the invention, wherein a front elevational side of the tie-down strap is shown in detail.
Figure 39:
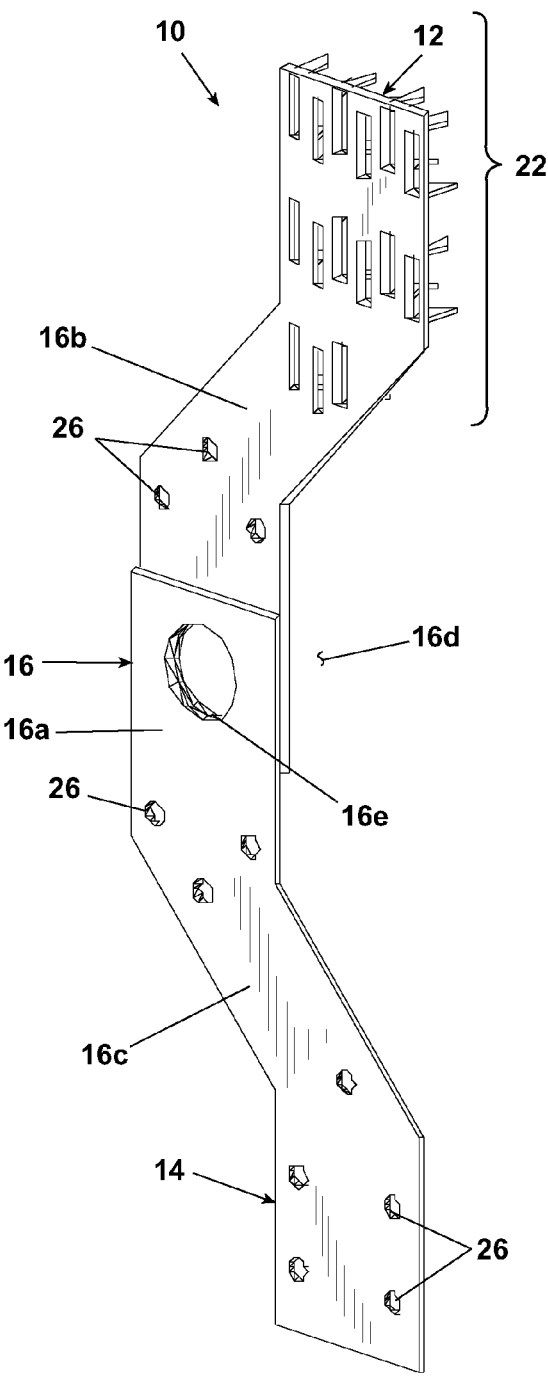
FIG. 39 is a perspective view of the fifth embodiment of the tie-down strap of FIG. 38, wherein a rear elevational side of the tie-down strap is shown in detail.
Figure 40:
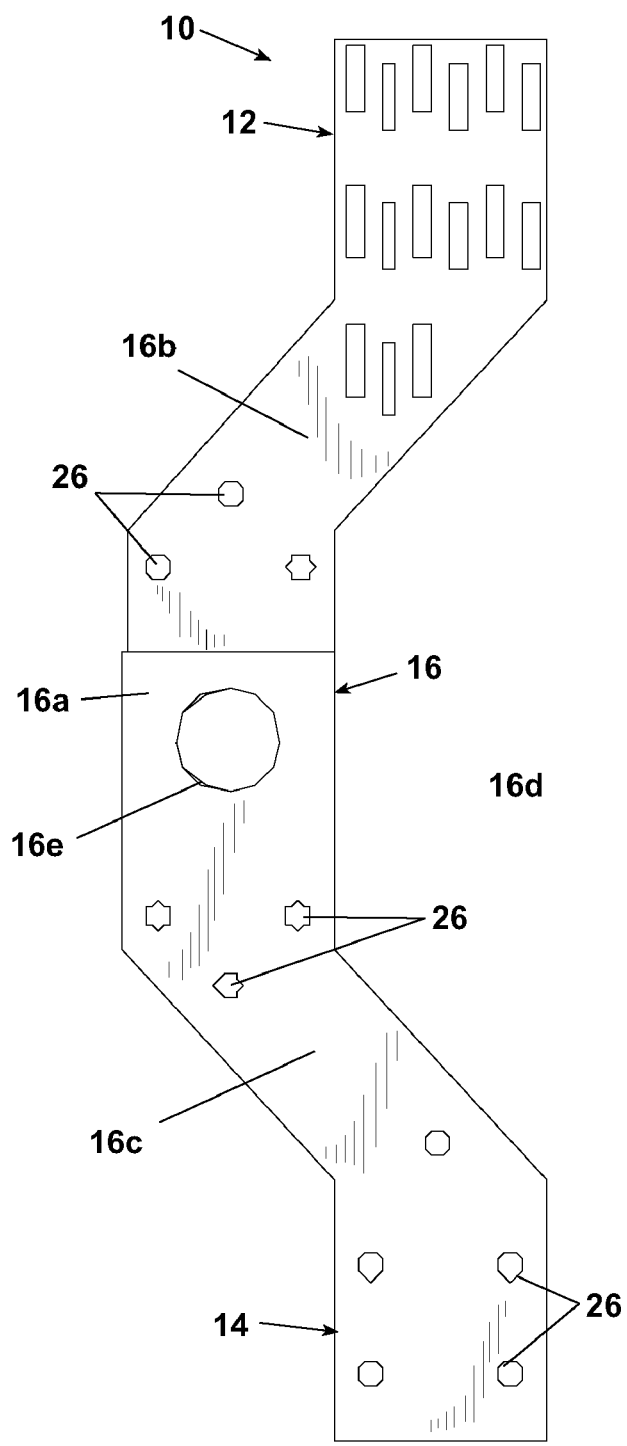
FIG. 40 is a front elevational view of the fifth embodiment of the tie-down strap of FIG. 38.
Figure 41:
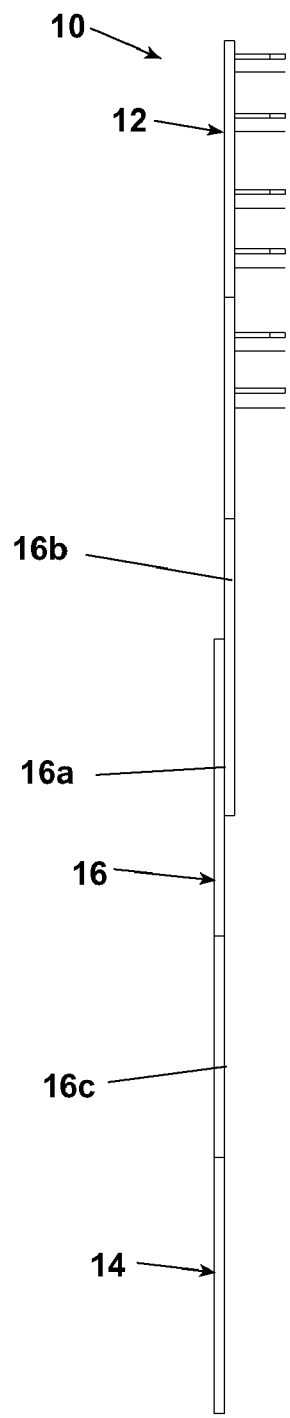
FIG. 41 is a side elevational view of the fifth embodiment of the tie-down strap of FIG. 38.

FIG. 37 shows a fourth embodiment of the connector 10. A difference between the fourth embodiment of FIG. 37 and the third embodiment shown in FIGS. 30–36 is that the nail plate on the first engagement portion 12 is replaced with several mounting apertures 26 so that the connector 10 can be field mounted to a pair of internal chords of a roof truss with suitable fasteners. Thus, like components and elements common to the fourth embodiment of FIG. 37 and the previous embodiments of FIGS. 1–36 are described with like reference numerals in the drawings. The structure, assembly and use of the fourth embodiment of the connector 10 in FIG. 37 is otherwise identical to that described with respect to the third embodiment (and the previous) embodiments of FIGS. 1–36.

A fifth embodiment of the connector 10 is shown by example in FIGS. 38–41. It will be understood that like elements between the first through fourth embodiments of FIGS. 1–37 and the fifth embodiment of FIGS. 38–41 are referred to with identical reference numerals. A difference between the earlier embodiments of FIGS. 1–37 and the fifth embodiment of FIGS. 38–41, respectively, is that the connector 10 in the earlier embodiments has a generally solid web 16 whereby the web 16 of the third embodiment of FIGS. 38–41 has a hinged portion 16e therein. This hinged portion 16e pivotally interconnects a pair of segments of the web 16 allowing the first engagement portion 12 to be pivoted with respect to the second engagement portion 14 through the hinged portion 16e in the web 16. Of course, as shown in FIGS. 38–41, the web 16 can also optionally have a side step configuration as in the third embodiment whereby the web 16 is offset from a linear axis of the connector 10 by angle webs 16b and 16c.

Figure 42:
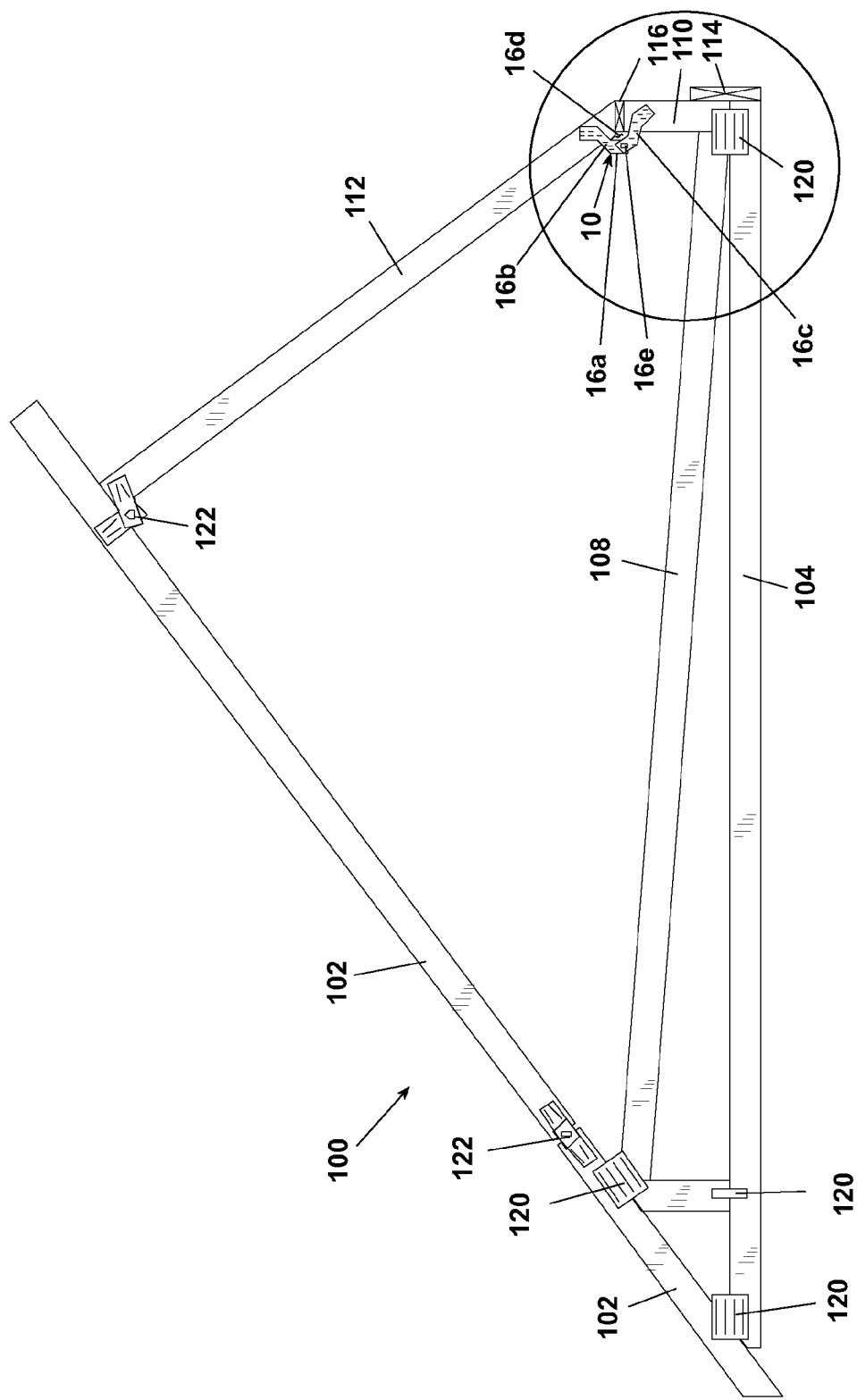
FIG. 42 is a front elevational view of a roof truss for mounting atop a housing frame in an erect position, wherein internal chords of the roof truss have a tie-down strap of FIGS. 38–41 mounted thereto.
Figure 43:
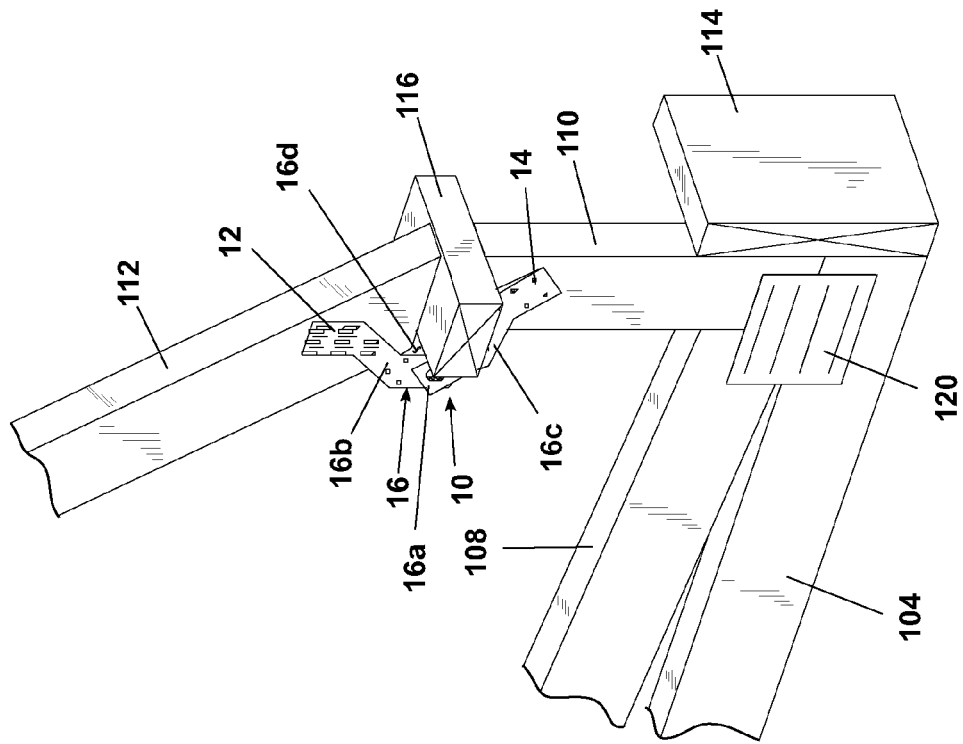
FIG. 43 is an enlarged perspective view of the area marked XLIII in FIG. 42.
Figure 44:
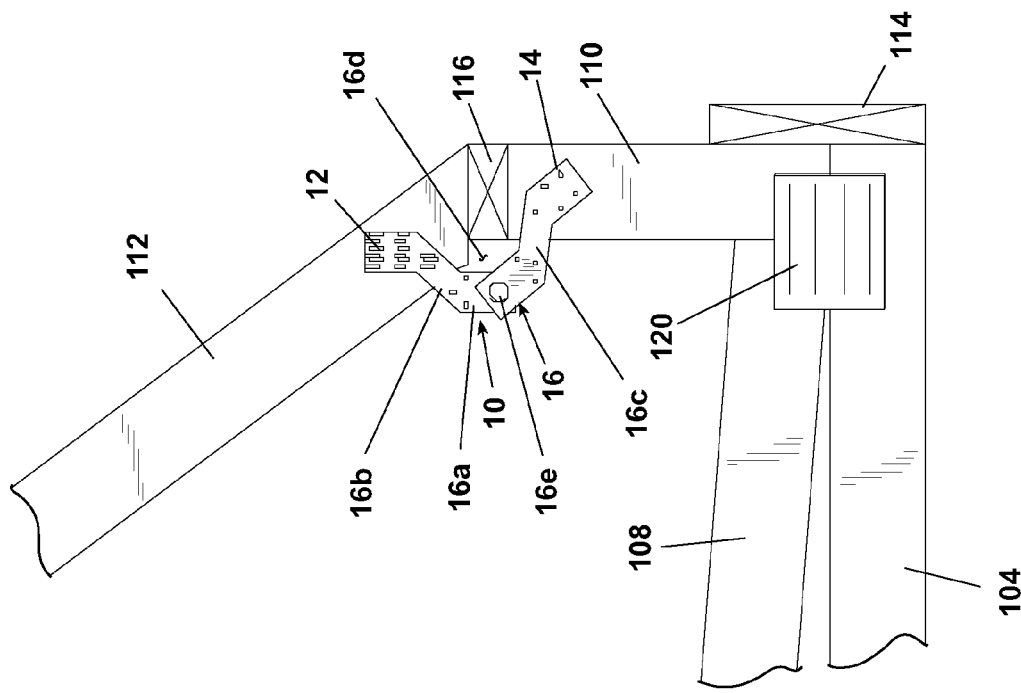
FIG. 44 is an enlarged front elevational view of the area marked XLIV in FIG. 42.

This configuration of the connector 10 is useful in areas where an internal chord member of a roof truss creates an obstruction to the interconnection of a pair of roof truss chords, in that the hinged portion 16e of the fifth embodiment of the connector 10 can be used to conveniently pivot one of the engagement portions 12 and/or 14 to traverse an obstructing and/or intervening chord member to bring one of the engagement portions into alignment with another chord of the roof truss for attachment as described below with respect to FIGS. 42–44.

An example of a roof truss 100 employing the fifth embodiment of the connector 10 shown in FIGS. 38–41 is shown FIGS. 42–44. It will be understood that the roof truss 100 of FIGS. 42–44 can be collapsed and erected in similar manner to the roof trusses shown and described with respect to the earlier embodiments in FIGS. 1–37. As can best be seen in FIGS. 42–44, the first engagement portion 12 of the third embodiment of the connector 10 is connected directly to a vertical surface adjacent a lower end portion of the knee wall 112 in an integral manner consistent with that described previously with respect to the earlier embodiments.

Typically after connection of the connector 10 to the knee wall 112 at a manufacturing facility, the roof truss 100 would thereby be shipped in a collapsed state (due to the pivoting of the hinge plates 122 therein) to an on-site installation location. The upper top chord 102 is then swung about the first hinge plate 122 and the knee wall 112 is positioned into alignment so that the second engagement portion 14 of the connector 10 is aligned with a vertical surface adjacent a top portion of the kingpost 110. The second engagement portion 14 is thereby mounted to the kingpost 110 by any suitable fastener, such as screws or nails passed through the apertures 26 in the second engagement portion 14 and/or any apertures 26 in any portion of the web 16.

As can be seen in FIGS. 42–44, the fifth embodiment of the connector 10 can be manipulated through pivotal movement of the segments making up the web 16 (i.e., through pivoting movement of the hinged portion 16e) into alignment with a desired portion of the kingpost 110. If the connector 10 includes angled portions 16b and 16c as shown in FIGS. 42–44, the web 16 can be jogged around various chords making up the roof truss 100 such as the runner rail 116 around which the connector 10 can be passed. As can be seen in these Figures, the angled web portions 16b and 16c traverse the web portion 16a around the runner rail 116 so that the runner rail 116 simply rests in the recess 16d. A beneficial feature of the angled web 16 (16a, 16b, 16c) creating the gap 16d and/or the hinged portion 16e eliminates the need to bend the material (e.g., steel) making up the connector 10 in the field to make a proper fit between the internal chords of a roof truss 100.

Figure 45:
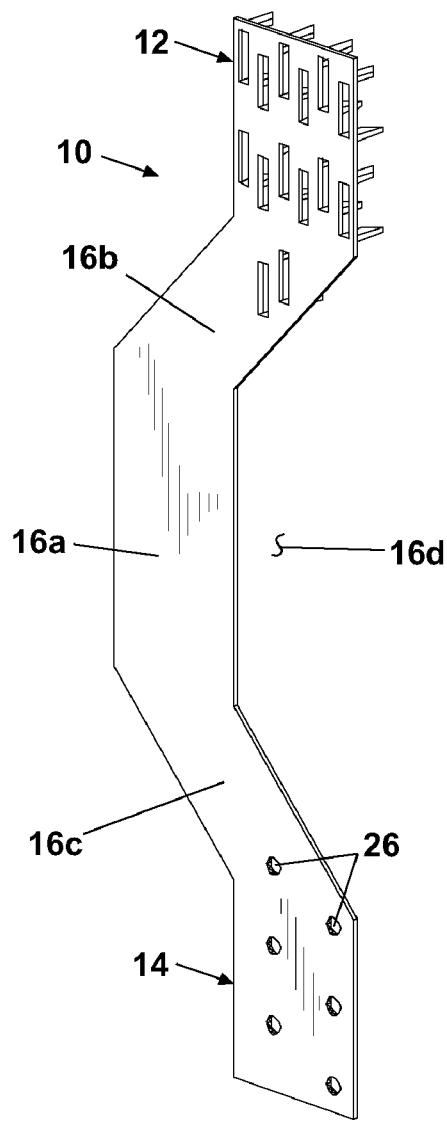
FIG. 45 is a perspective view of a sixth embodiment of a tie-down strap according to the invention, wherein a front elevational side of the tie-down strap is shown in detail.
Figure 46:
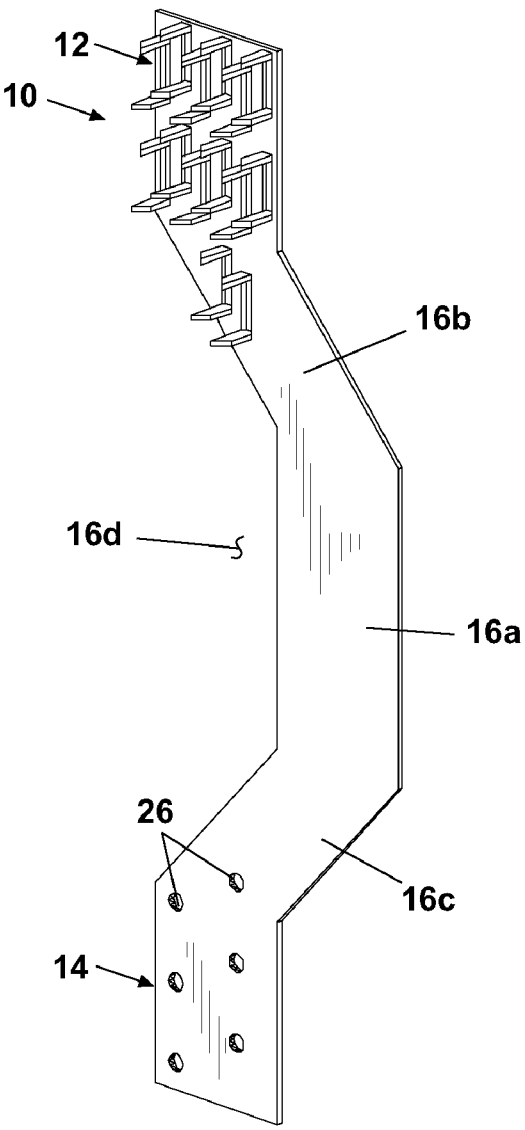
FIG. 46 is a perspective view of the sixth embodiment of the tie-down strap of FIG. 45, wherein a rear elevational side of the tie-down strap is shown in detail.
Figure 47:
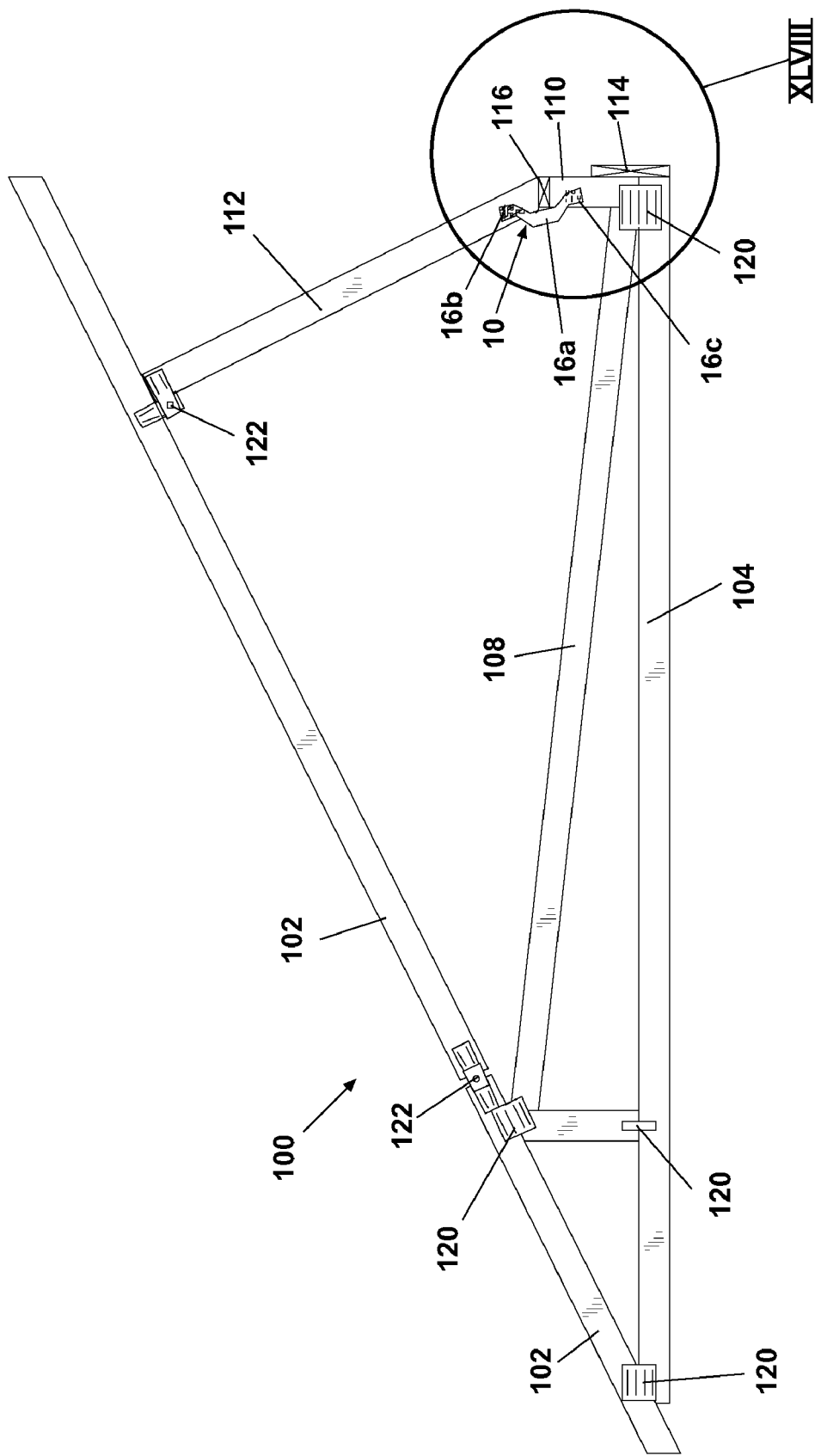
FIG. 47 is a front elevational view of a single monohinge truss having the tie-down strap of FIGS. 45–46 mounted thereto, wherein the truss is shown in an erected state.
Figure 48:
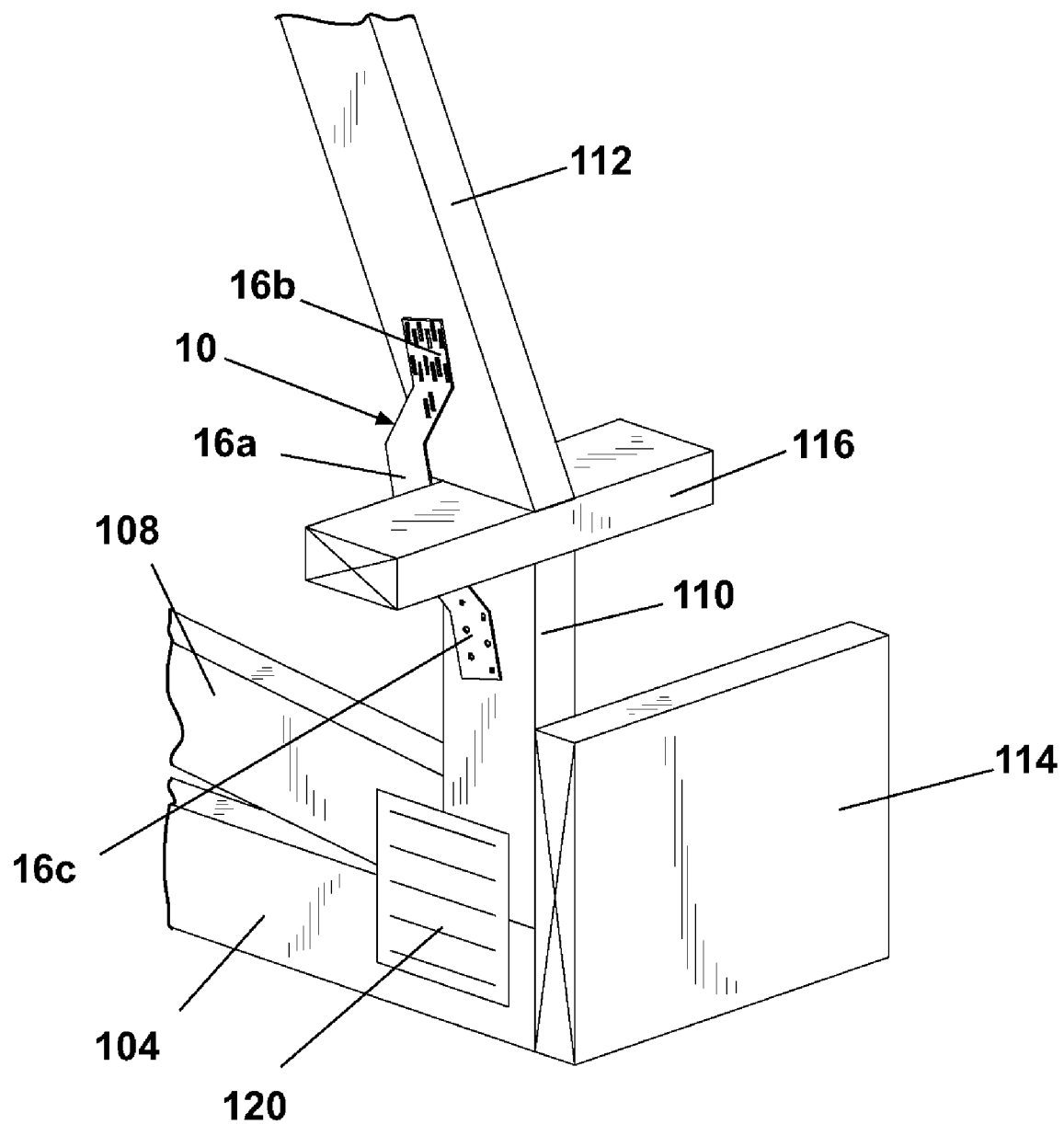
FIG. 48 is an enlarged perspective view of the area marked XLVIII in FIG. 47.
Figure 49:
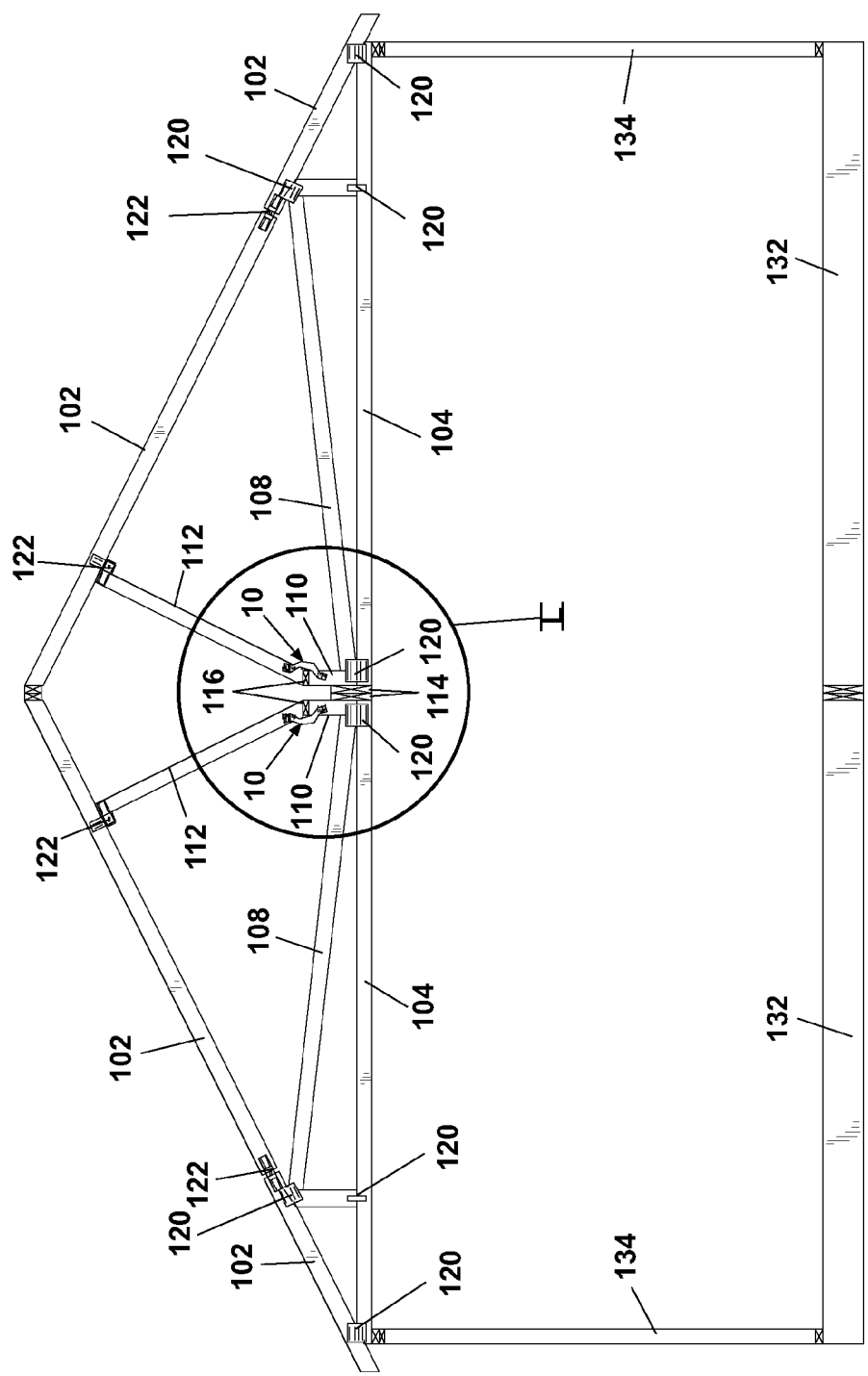
FIG. 49 is a front elevational view of a pair of juxtaposed trusses of FIG. 47 in the erect position mounted atop a housing frame to form a roof portion thereof.
Figure 50:
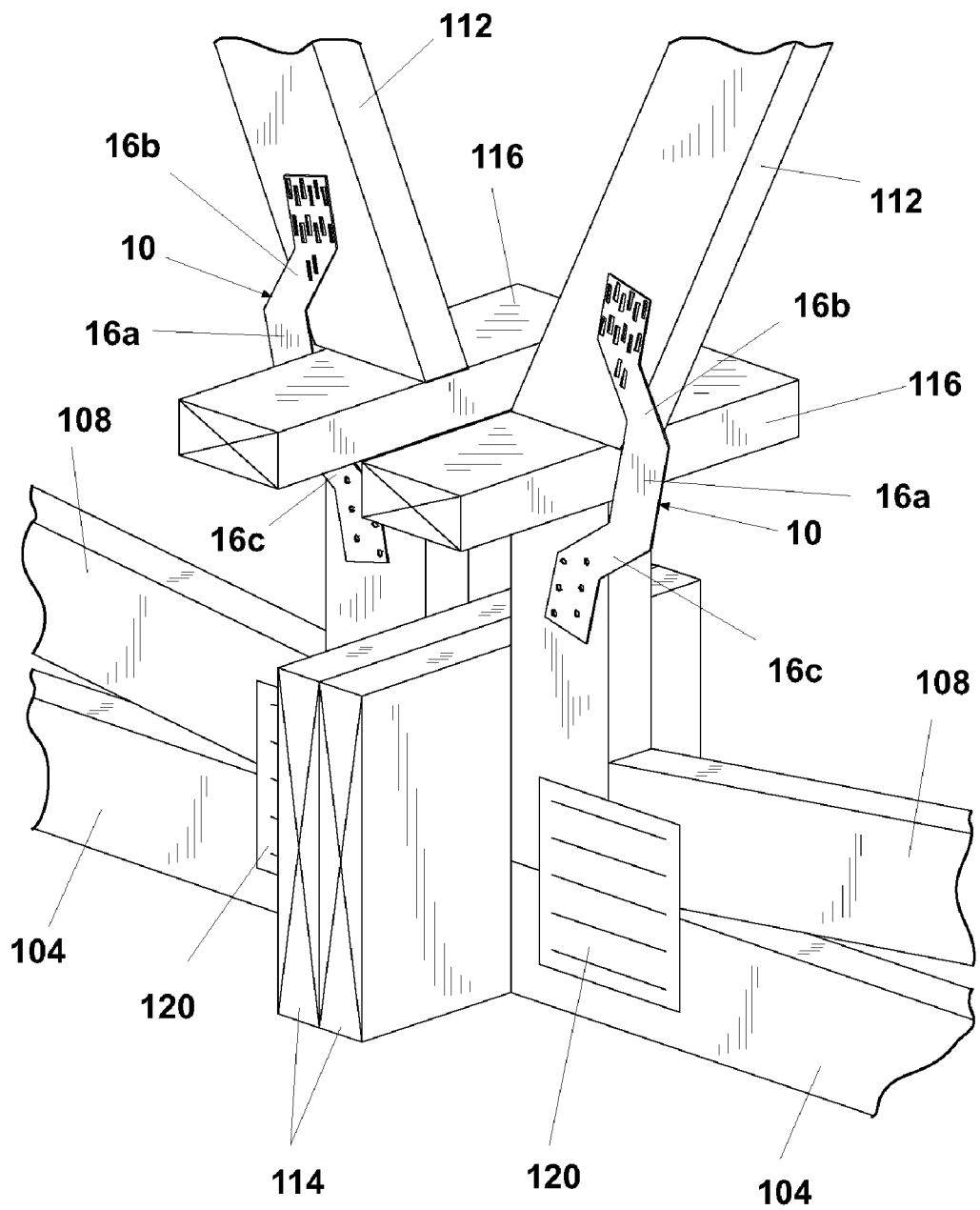
FIG. 50 is an enlarged perspective view of the area marked XL in FIG. 49.
Figure 51:
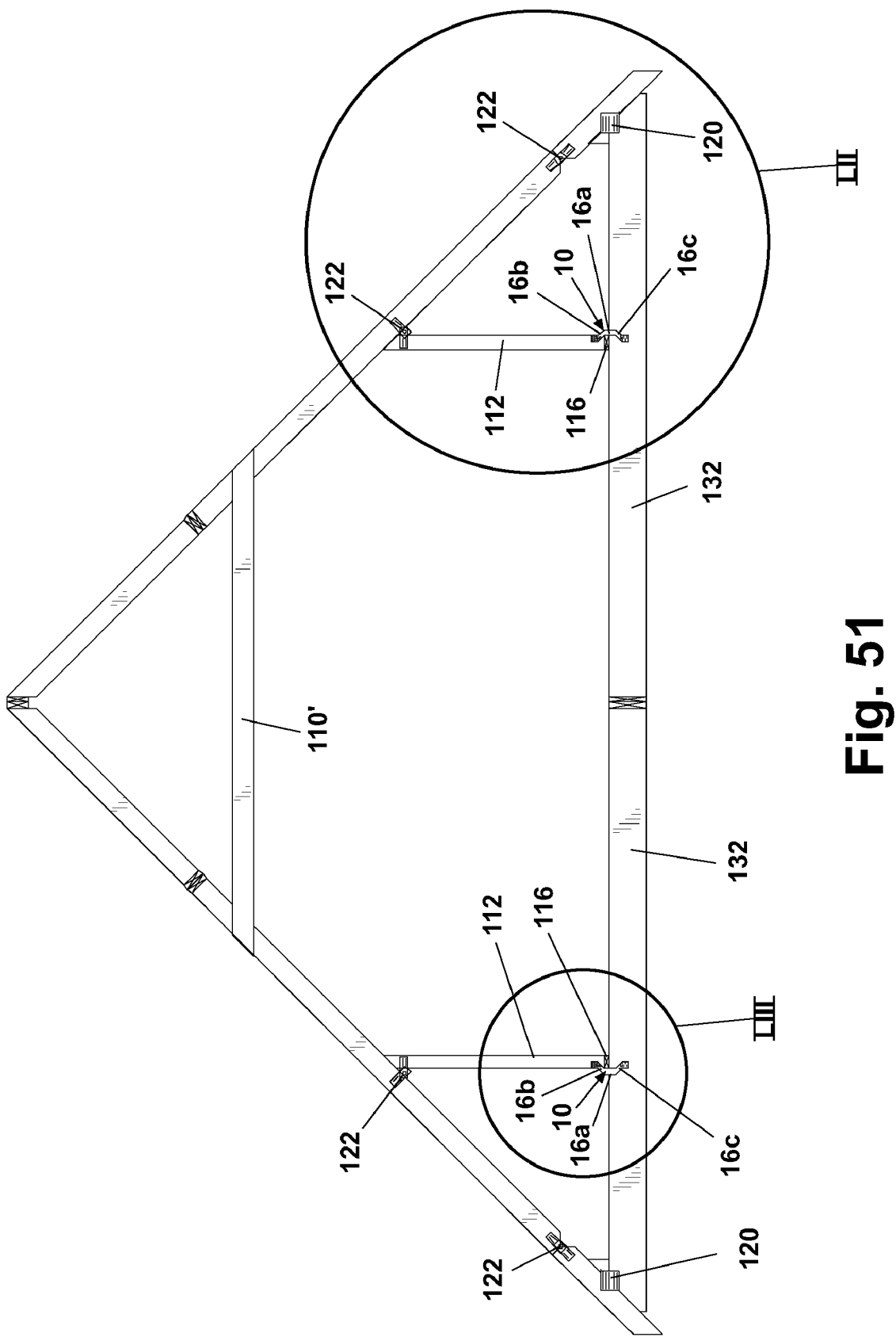
FIG. 51 is a front elevational view of a Cape Cod-style roof truss in an erected state, wherein kneewall chords of the roof truss have tie-down straps of FIGS. 45–46 mounted thereto.
Figure 52:
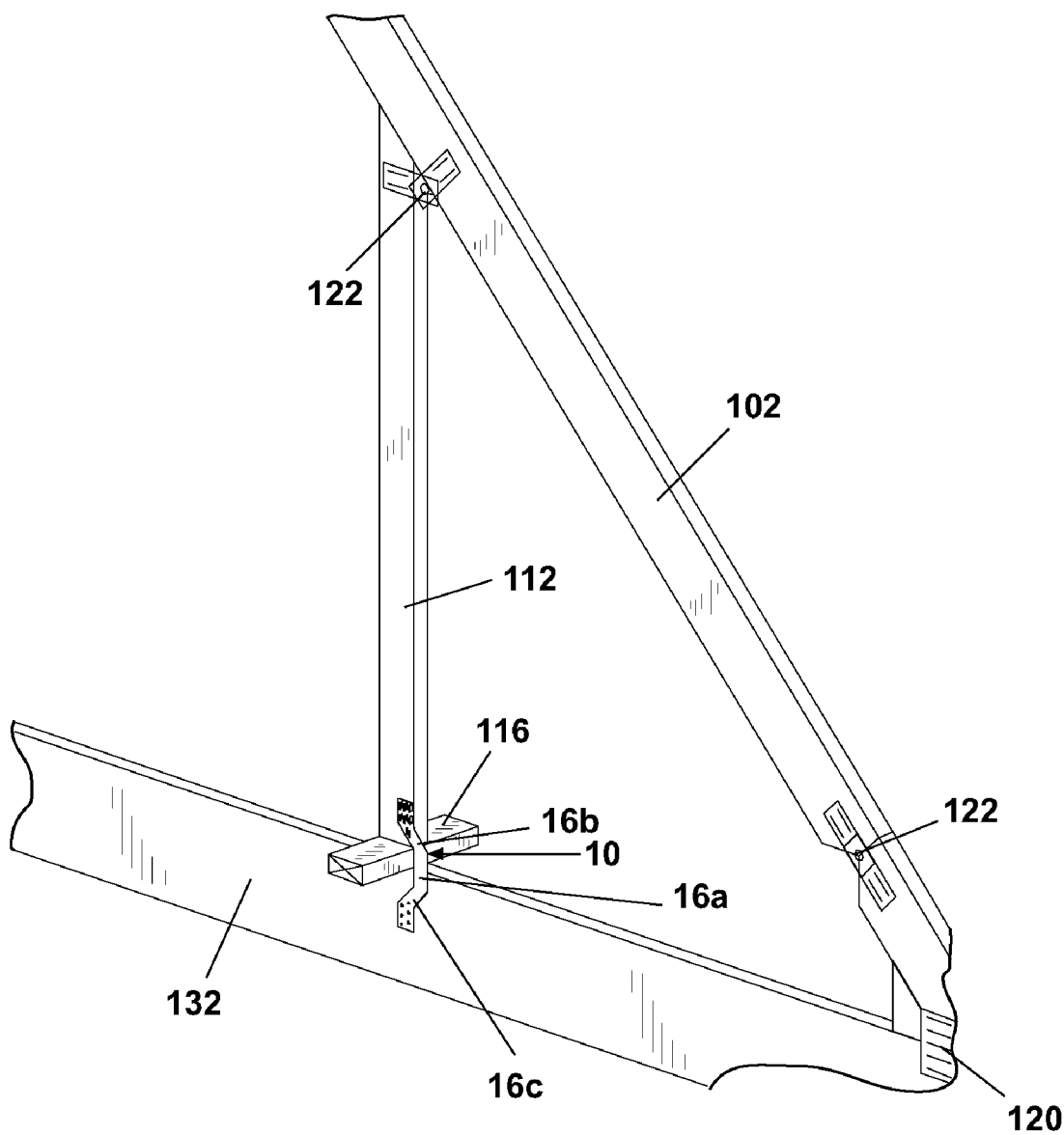
FIG. 52 is an enlarged perspective view of the area marked XLII in FIG. 51.
Figure 53:
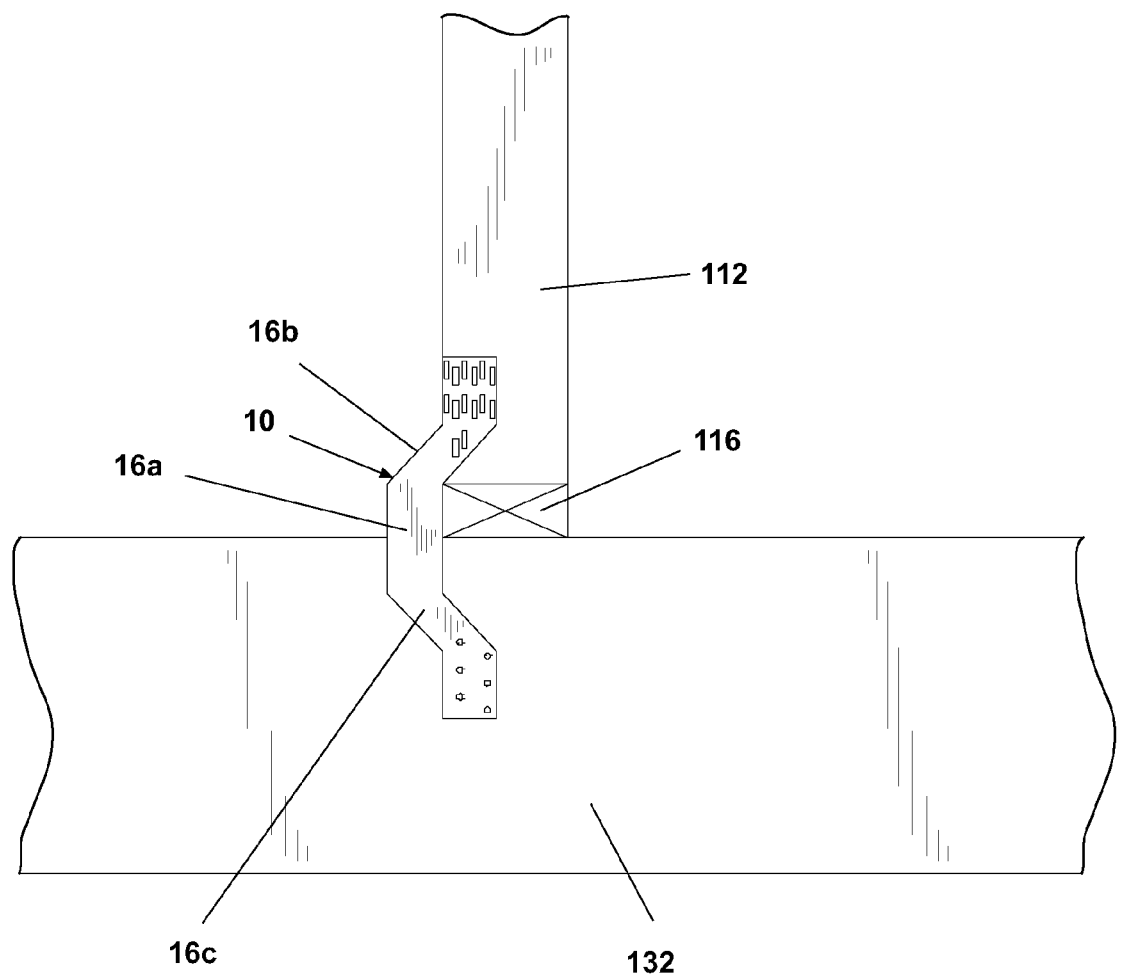
FIG. 53 is an enlarged front elevational view of the area marked XLIII in FIG. 51.

A sixth embodiment of the connector 10 is shown by example in FIGS. 45–53 and in greater detail in FIGS. 45–46. It will be understood that like elements between the first through fifth embodiments of FIGS. 1–44 and the sixth embodiment of FIGS. 45–53 are referred to with identical reference numerals. Of course, as shown in FIGS. 45–46, the web 16 can also optionally have a side-step configuration as in previous embodiments whereby the web 16 is offset from a linear axis of the connector 10 by angle webs 16b and 16c.

This configuration of the connector 10, as with previous embodiments thereof, is useful in areas where an internal chord member of a roof truss creates an obstruction to the interconnection of a pair of roof truss chords, in that the hinged portion 16e of the fifth embodiment of the connector 10 can be used to conveniently pivot one of the engagement portions 12 and/or 14 to traverse an obstructing and/or intervening chord member to bring one of the engagement portions into alignment with another chord of the roof truss for attachment as described below with respect to FIGS. 47–53.

Examples of roof trusses 100 employing the sixth embodiment of the connector 10 shown in FIGS. 45–46 are shown FIGS. 47–53. It will be understood that the roof trusses 100 of FIGS. 47–53 can be collapsed and erected in similar manner to the roof trusses shown and described with respect to the earlier embodiments in FIGS. 1–44. As can best be seen in FIGS. 45–46, the first engagement portion 12 of the third embodiment of the connector 10 is connected directly to a vertical surface adjacent a lower end portion of the knee wall 112 in an integral manner consistent with that described previously with respect to the earlier embodiments.

Typically after connection of the connector 10 to the knee wall 112 at a manufacturing facility, the roof truss 100 would thereby be shipped in a collapsed state (due to the pivoting of the hinge plates 122 therein) to an on-site installation location. The upper top chord 102 is then swung about the first hinge plate 122 and the knee wall 112 is positioned into alignment so that the second engagement portion 14 of the connector 10 is aligned with a vertical surface adjacent a top portion of the kingpost 110. The second engagement portion 14 is thereby mounted to the kingpost 110 by any suitable fastener, such as screws or nails passed through the apertures 26 in the second engagement portion 14 and/or any apertures 26 in any portion of the web 16.

Since the connector 10 includes angled portions 16b and 16c as shown in FIGS. 45–46, the web 16 can be jogged around various chords making up the roof truss 100 such as the runner rail 116 around which the connector 10 can be passed. As can be seen in these Figures, the angled web portions 16b and 16c traverse the web portion 16a around the runner rail 116 so that the runner rail 116 simply rests in the recess 16d. A beneficial feature of the angled web 16 (16a, 16b, 16c) creating the gap 16d and/or the hinged portion 16e eliminates the need to bend the material (e.g., steel) making up the connector 10 in the field to make a proper fit between the internal chords of a roof truss 100.

An inventive concept embodied in the connector 10 is a pre-fabricated connector that has one side with pre-punched teeth for pressing into a wood member and the opposite side with a bendable field connection that allows field construction crews to make final field connections. One purpose of the connector 10 is to transfer the structural forces (axial tension) that develop in the roof truss chords under uplift load. Preferably, the connector 10 is installed integral with the truss 100 at the time of truss manufacture.

The connector 10 blends in-plant fastening (see the first engagement portion 12) methods that permit mass production with an opposing portion (see the second engagement portion 14) having a field-installed face with pre-drilled apertures 26 to permit final construction by field crews. Field setup crews simply swing parts into place (using the hinge plates 122) and apply a preferable number of fasteners into the pre-punched apertures 26. The invention has commercial advantages in the modular housing industry and truss-manufacturing plants where pre-fabricated structural components are formed from wood and pre-punched steel plates.

Thus, there are apparent benefits derived from the connector 10. The connector 10 is installed integral with the truss at time of manufacture. Integral can mean that the connector 10 can be fastened to the truss 100 at the time of truss manufacture. The connector 10 can be attached to the truss 100 at a the truss builder's plant, then shipped to a home building plant for placement on the roof of a supporting structure. The truss remains in a collapsed position until reaching the installation site wherein the modular structure is lifted onto a pre-poured foundation or piers. After the home is set, the truss is raised into its final position. An installation team (commonly referred to as a "set crew") swings the hinged knee walls into place to support the truss and initiate securement of a free end of the knee wall 112 to the kingpost 110 to handle design uplift and compressive loads. Since the connector 110 is preferably built integral with the truss 100, only one end of the connector 10 needs to be fastened by the installation team. The team preferably installs a specified number of mechanical fasteners into the wood members and a strong, preferably rigid connection is created between the internal chords of the truss 100. The connector 10 is effective in transmitted internal tensile forces encountered within the roof truss 100.

Another benefit of this type of integral design is that the truss design engineer has an opportunity to specify a pre-fabricated connection that will be built with the truss 100, and to check that connection for performance against predicted design stresses. By raising the truss 100, the housing structure has an aesthetically-pleasing slope and architectural features that are preferred by many home-owners. The truss 100 typically must be collapsed during transportation to comply with highway height restrictions. The connector 10 permits the roof truss 100 to be collapsed, and then raised on-site and quickly attached to the connector 10 with conventional fasteners. The connector 10 permits connection of the knee wall 112 to the kingpost 110 (and/or directly to the bottom chord 104) either directly or by "jogging" around other intervening chords (e.g., a typical 1½" runner rail 116) that manufacturers typically use to tie their roof truss systems together.

As with all depictions of the use of the various embodiments of the connector 10 shown herein, the particular roof truss chords to which the first and second engagement portions 12 and 14 are connected can be reversed in both orientation and position without departing from the scope of this invention. For example, in FIGS. 14 and 27, the connector 10 can be rotated, flipped or otherwise repositioned (e.g., vertically and/or horizontally) as required by the particular space, alignment and connection requirements of a particular roof truss and the positioning of the connector 10 in the embodiments and use configurations shown herein is entirely by example and shall not be construed as limiting on the scope of this invention.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The invention claimed is:

1. A prefabricated roof truss that is positionable in a first collapsed position and a second erected position comprising:
    a matrix of interconnected chord members forming a truss in the second erected position;
    a first chord member of the truss having a connector strap mounted thereto, the connector strap having a first end interconnected to the first chord member and a second end extending therefrom, the first and second ends having an offset portion therebetween that defines a recess therebetween;
    a second chord member that is positionable adjacent to the first chord member, wherein the second end of the connector is adapted to be interconnected to the second chord member when the truss is positioned in the second, erected position;
    a third chord member positionable adjacent to and generally orthogonally to the first and second chord members and generally intersecting the first and second chord members, wherein the third chord member is at least partially received in the recess of the connector when the first and second ends thereof are mounted to the respective first and second chords.

2. The prefabricated roof truss of claim 1 wherein the connector includes a hinge portion between the first end and the second end thereof, wherein the first sidestep portion can thereby be pivoted with respect to the second sidestep portion.

3. The prefabricated roof truss of claim 1 wherein the first end of the connector includes at least one first mounting portion thereon.

4. The prefabricated roof truss of claim 3 wherein the first mounting portion comprises at least one of an aperture, an integral connector, a drivable connector, and a nail plate.

5. The prefabricated roof truss of claim 4 wherein the second end of the connector includes at least one second mounting portion thereon.

6. The prefabricated roof truss of claim 5 wherein the second mounting portion comprises at least one of an aperture, an integral connector, a drivable connector, and a nail plate.

7. The prefabricated roof truss of claim 1 wherein an intermediate portion of the connector is deformable between a first linear position and a second final mounting position, whereby the connector can be deformed when mounted between the first and second chord members of the truss.

8. The prefabricated roof truss of claim 1 wherein the first end of the connector has an integral mounting portion thereon and the second end of the connector has a field mounting thereon.

9. The prefabricated roof truss of claim 8 wherein the integral mounting portion comprises at least one of an aperture, an integral connector, a drivable connector, and a nail plate.

10. The prefabricated roof truss of claim 8 wherein the integral mounting portion of the first end of the connector is integrally mounted to the first chord member of the truss at the time of manufacture of the truss, and the second end of the connector is extended from the first chord member in a position adapted to receive the second chord member of the truss.

11. The prefabricated roof truss of claim 1 wherein the second chord member is mounted to the second end of the connector when the truss is erected in the field.

12. The prefabricated roof truss of claim 1 wherein the first and second ends of the connector extend from the connector in substantially the same lateral direction.

13. The prefabricated roof truss of claim 1 wherein the first and second ends of the connector extend angularly from the connector in substantially the same direction.

14. The prefabricated roof truss of claim 1 wherein the first and second ends of the connector extend from the connector in substantially the opposite lateral direction.

15. The prefabricated roof truss of claim 1 wherein the first and second ends of the connector extend angularly from the connector in substantially the opposite direction.

* * * * *